US012403055B2

(12) United States Patent
Hight et al.

(10) Patent No.: US 12,403,055 B2
(45) Date of Patent: Sep. 2, 2025

(54) SURGICAL PATIENT SUPPORT FOR LATERAL-TO-PRONE PATIENT POSITIONING

(71) Applicant: Allen Medical Systems, Inc., Batesville, IN (US)

(72) Inventors: Joshua C. Hight, Littleton, MA (US); Jesse S. Drake, Westborough, MA (US); Jeffrey C. Marrion, Acton, MA (US); Christopher B. Dubois, Marlborough, MA (US); Ben Hertz, Acton, MA (US); Andrew Sennett, Hanover, MA (US); Patrick Brophy, Medford, MA (US)

(73) Assignee: Allen Medical Systems, Inc., Batesville, IN (US)

( * ) Notice: Subject to any disclaimer, the term of this patent is extended or adjusted under 35 U.S.C. 154(b) by 1071 days.

(21) Appl. No.: 17/386,731

(22) Filed: Jul. 28, 2021

(65) Prior Publication Data

US 2021/0353487 A1 Nov. 18, 2021

Related U.S. Application Data

(63) Continuation of application No. 16/451,446, filed on Jun. 25, 2019, now Pat. No. 11,096,853, which is a (Continued)

(51) Int. Cl.

| | |
|---|---|
| ***A61G 13/08*** | (2006.01) |
| ***A61G 13/00*** | (2006.01) |

(Continued)

(52) U.S. Cl.
CPC ......... *A61G 13/08* (2013.01); *A61G 13/0054* (2016.11); *A61G 13/04* (2013.01); (Continued)

(58) Field of Classification Search
CPC ........ A61G 13/04; A61G 13/06; A61G 13/08; A61G 13/0054; A61G 13/122; (Continued)

(56) References Cited

U.S. PATENT DOCUMENTS

| | | | |
|---|---|---|---|
| 866,309 | A | 9/1907 | Scanlan |
| 1,021,335 | A | 3/1912 | Robinson et al. |

(Continued)

FOREIGN PATENT DOCUMENTS

| | | |
|---|---|---|
| DE | 1162508 | 2/1967 |
| DE | 3438956 | 5/1985 |

(Continued)

OTHER PUBLICATIONS

Japanese Office Action for Japanese Patent Application No. 2016-207199 dated Apr. 3, 2018 and its English translation (15 pages).

(Continued)

*Primary Examiner* — David R Hare
(74) *Attorney, Agent, or Firm* — Barnes & Thornburg LLP

(57) ABSTRACT

According to the present disclosure, a surgical patient support provides support to a patient. The surgical patient support may include configuration to accommodate various patient body positions to provide a variety of access to the patient's body.

19 Claims, 11 Drawing Sheets

Related U.S. Application Data continuation of application No. 15/290,156, filed on Oct. 11, 2016, now Pat. No. 10,363,189.

(60) Provisional application No. 62/352,711, filed on Jun. 21, 2016, provisional application No. 62/245,646, filed on Oct. 23, 2015.

(51) Int. Cl.
*A61G 13/04* (2006.01)
*A61G 13/06* (2006.01)
*A61G 13/12* (2006.01)

(52) U.S. Cl.
CPC ..... *A61G 13/1245* (2013.01); *A61G 13/1295* (2013.01); *A61G 13/06* (2013.01); *A61G 13/122* (2013.01); *A61G 13/123* (2013.01); *A61G 13/1235* (2013.01); *A61G 2200/322* (2013.01); *A61G 2200/325* (2013.01)

(58) Field of Classification Search
CPC .............. A61G 13/123; A61G 13/1235; A61G 13/1245; A61G 13/1295; A61G 2200/322; A61G 2200/325
USPC .............................................................. 5/613
See application file for complete search history.

(56) References Cited

U.S. PATENT DOCUMENTS 1,098,477 A 6/1914 Cashman
1,160,451 A 11/1915 Sanford
1,171,713 A 2/1916 Gilkerson
1,372,565 A 3/1921 Skelly
1,528,835 A 3/1925 McCollough
1,662,464 A 3/1928 McCutchen
1,799,692 A 4/1931 Knott
1,938,006 A 12/1933 Blanchard
2,103,693 A 12/1937 Pohl
2,188,592 A 1/1940 Hosken
2,261,297 A 11/1941 Seib
2,337,505 A 12/1943 Swift
2,452,816 A 11/1948 Wagner
2,613,371 A 10/1952 Keyes, Jr.
2,636,793 A 4/1953 Meyer
2,667,169 A 1/1954 Kambourakis
2,688,410 A 9/1954 Nelson
2,691,979 A 10/1954 Watson
2,764,150 A 9/1956 Ettinger et al.
2,792,945 A 5/1957 Brenny
2,803,022 A 8/1957 Wynkoop
2,880,720 A 4/1959 Houghtaling
3,046,071 A 7/1962 Shampaine et al.
3,049,726 A 8/1962 Getz
3,090,381 A 5/1963 Watson
3,206,188 A 9/1965 Douglass, Jr.
3,226,734 A 1/1966 Coventon
3,238,539 A 3/1966 Albert
3,281,141 A 10/1966 Smiley
3,286,707 A 11/1966 Shafer
3,302,218 A 2/1967 Stryker
3,388,700 A 6/1968 Mountz
3,428,307 A 2/1969 Owen
3,434,165 A 3/1969 Keane
3,584,321 A 6/1971 Buchanan
3,599,964 A 8/1971 Magni
3,640,416 A 2/1972 Temple
3,652,851 A 3/1972 Zaalberg
3,739,406 A 6/1973 Koetter
3,745,996 A 7/1973 Rush
3,751,028 A 8/1973 Scheininger et al.
3,766,384 A 10/1973 Anderson et al.
3,795,018 A 3/1974 Broaded
3,814,414 A 6/1974 Chapa
3,827,089 A 8/1974 Grow
3,832,742 A 9/1974 Stryker
3,859,982 A 1/1975 Dove
3,873,081 A 3/1975 Smith et al.
3,895,403 A 7/1975 Davis et al.
3,946,452 A 3/1976 Eary
3,949,983 A 4/1976 Tommasino et al.
3,988,790 A 11/1976 Mracek et al.
4,071,916 A 2/1978 Nelson
4,101,120 A 7/1978 Seshima
4,131,802 A 12/1978 Braden et al.
4,144,880 A 3/1979 Daniels
4,148,472 A 4/1979 Rais
4,175,550 A 11/1979 Leininger et al.
4,186,917 A 2/1980 Rais et al.
4,227,269 A 10/1980 Johnston
4,239,039 A 12/1980 Thompson
4,244,358 A 1/1981 Pyers
4,257,407 A 3/1981 Macchi
4,356,577 A 11/1982 Taylor et al.
4,384,378 A 5/1983 Getz et al.
4,398,707 A 8/1983 Cloward
4,459,712 A 7/1984 Pathan
4,503,844 A 3/1985 Siczek et al.
4,545,571 A 10/1985 Chambron
4,552,346 A 11/1985 Schnelle et al.
4,579,111 A 4/1986 Ledesma
4,658,450 A 4/1987 Thompson
4,678,171 A 7/1987 Sanders
4,712,781 A 12/1987 Watanabe
4,730,606 A 3/1988 Leininger
4,763,643 A 8/1988 Vrzalik
4,769,584 A 9/1988 Irigoyen et al.
4,771,785 A 9/1988 Duer et al.
4,827,541 A 5/1989 Vollman
4,840,362 A 6/1989 Bremer et al.
4,850,775 A 7/1989 Lee et al.
4,858,128 A 8/1989 Alsip et al.
4,866,796 A 9/1989 Robinson et al.
4,868,937 A 9/1989 Connolly
4,872,657 A 10/1989 Lussi
4,887,325 A 12/1989 Tesch
4,924,537 A 5/1990 Alsip et al.
4,937,901 A 7/1990 Brennan
4,939,801 A 7/1990 Schaal et al.
4,944,054 A 7/1990 Bossert
4,944,500 A 7/1990 Mueller et al.
4,947,496 A 8/1990 Connolly
4,953,245 A 9/1990 Jung
4,970,737 A 11/1990 Sagel
5,020,170 A 6/1991 Ruf
5,088,706 A 2/1992 Jackson
5,131,106 A 7/1992 Jackson
5,152,024 A 10/1992 Chrones
5,161,267 A 11/1992 Smith
5,181,289 A 1/1993 Kassai
5,210,887 A 5/1993 Kershaw
5,210,888 A 5/1993 Canfield
5,231,741 A 8/1993 Maguire
5,239,716 A 8/1993 Fisk
5,274,862 A 1/1994 Palmer et al.
5,333,334 A 8/1994 Kassai
5,393,018 A 2/1995 Roth et al.
5,404,603 A 4/1995 Fukai et al.
5,444,882 A 8/1995 Andrews et al.
5,461,740 A * 10/1995 Pearson ................. A61G 7/012
5/607
5,483,323 A 1/1996 Matsuda et al.
5,487,195 A 1/1996 Ray
5,499,409 A 3/1996 Nix
5,502,853 A 4/1996 Singleton et al.
5,524,304 A 6/1996 Shutes
5,544,371 A 8/1996 Fuller
5,579,550 A 12/1996 Bathrick et al.
5,588,705 A 12/1996 Chang
5,613,254 A 3/1997 Clayman et al.
5,658,315 A 8/1997 Lamb et al.
5,673,443 A 10/1997 Marmor
5,737,781 A 4/1998 Votel et al.
5,775,334 A 7/1998 Lamb et al.

(56) References Cited

U.S. PATENT DOCUMENTS

| | | | |
|---|---|---|---|
| 5,778,467 | A | 7/1998 | Scott et al. |
| 5,794,286 | A | 8/1998 | Scott et al. |
| 5,890,238 | A | 4/1999 | Votel et al. |
| 5,901,388 | A | 5/1999 | Cowan |
| 5,926,871 | A | 7/1999 | Howard |
| 5,937,456 | A | 8/1999 | Norris |
| 5,950,259 | A | 9/1999 | Boggs |
| 6,003,174 | A | 12/1999 | Kantrowitz et al. |
| 6,035,465 | A | 3/2000 | Rogozinski |
| 6,042,558 | A | 3/2000 | Hoyne et al. |
| 6,049,923 | A | 4/2000 | Ochiai |
| 6,076,525 | A | 6/2000 | Hoffman |
| 6,094,760 | A | 8/2000 | Nonaka et al. |
| 6,108,838 | A | 8/2000 | Connolly et al. |
| 6,112,349 | A | 9/2000 | Connolly |
| 6,154,901 | A | 12/2000 | Carr |
| 6,230,342 | B1 | 5/2001 | Haugs |
| 6,260,220 | B1 | 7/2001 | Lamb et al. |
| 6,282,736 | B1 | 9/2001 | Hand |
| 6,286,164 | B1 | 9/2001 | Lamb et al. |
| 6,295,671 | B1 | 10/2001 | Reesby et al. |
| 6,311,349 | B1 | 11/2001 | Kazakia et al. |
| 6,315,564 | B1 | 11/2001 | Levisman |
| 6,324,710 | B1 | 12/2001 | Hernandez et al. |
| 6,385,801 | B1 | 5/2002 | Watanabe et al. |
| 6,421,854 | B1 | 7/2002 | Heimbrock |
| 6,438,777 | B1 | 8/2002 | Bender |
| 6,496,991 | B1 | 12/2002 | Votel |
| 6,499,158 | B1 | 12/2002 | Easterling |
| 6,499,160 | B2 | 12/2002 | Hand et al. |
| 6,505,365 | B1 | 1/2003 | Hanson et al. |
| 6,523,197 | B2 | 2/2003 | Zitzmann |
| 6,526,610 | B1 | 3/2003 | Hand |
| 6,584,630 | B1 | 7/2003 | Dinkler |
| 6,609,260 | B2 | 8/2003 | Hand et al. |
| 6,615,430 | B2 | 9/2003 | Heimbrock |
| 6,622,324 | B2 | 9/2003 | VanSteenburg et al. |
| 6,634,043 | B2 | 10/2003 | Lamb et al. |
| 6,637,058 | B1 | 10/2003 | Lamb |
| 6,638,299 | B2 | 10/2003 | Cox |
| 6,662,388 | B2 | 12/2003 | Friel et al. |
| 6,662,391 | B2 | 12/2003 | Wilson et al. |
| 6,668,396 | B2 | 12/2003 | Wei |
| 6,671,904 | B2 | 1/2004 | Easterling |
| 6,681,423 | B2 | 1/2004 | Zachrisson |
| 6,691,347 | B2 | 2/2004 | Hand et al. |
| 6,701,553 | B1 | 3/2004 | Hand |
| 6,701,554 | B2 | 3/2004 | Heimbrock |
| 6,721,976 | B2 | 4/2004 | Schwaegerle |
| 6,813,788 | B2 | 11/2004 | Dinkler et al. |
| 6,817,363 | B2 | 11/2004 | Biondo et al. |
| 6,854,137 | B2 | 2/2005 | Johnson |
| 6,857,144 | B1 | 2/2005 | Huang |
| 6,859,967 | B2 | 3/2005 | Harrison et al. |
| 6,862,759 | B2 | 3/2005 | Hand et al. |
| 6,862,761 | B2 | 3/2005 | Hand et al. |
| 6,874,181 | B1 | 4/2005 | Vijayendran |
| 6,886,199 | B1 | 5/2005 | Schwaegerle |
| 6,898,811 | B2 | 5/2005 | Zucker et al. |
| 6,912,959 | B2 | 7/2005 | Kolody et al. |
| 6,928,676 | B1 | 8/2005 | Schwaegerle |
| 6,941,951 | B2 | 9/2005 | Hubert et al. |
| 6,966,081 | B1 | 11/2005 | Sharps et al. |
| 6,971,997 | B1 | 12/2005 | Ryan et al. |
| 6,986,179 | B2 | 1/2006 | Varadharajulu et al. |
| 7,020,917 | B1 | 4/2006 | Kolody et al. |
| 7,080,422 | B2 | 7/2006 | Ben-Levi |
| 7,086,103 | B2 | 8/2006 | Barthelt |
| 7,089,612 | B2 | 8/2006 | Rocher et al. |
| 7,089,884 | B2 | 8/2006 | Wang et al. |
| 7,103,932 | B1 | 9/2006 | Kandora |
| 7,137,160 | B2 | 11/2006 | Hand et al. |
| 7,152,261 | B2 | 12/2006 | Jackson |
| 7,171,709 | B2 | 2/2007 | Weismiller |
| 7,197,778 | B2 | 4/2007 | Sharps |
| 7,214,138 | B1 | 5/2007 | Stivers et al. |
| 7,216,385 | B2 | 5/2007 | Hill |
| 7,234,180 | B2 | 6/2007 | Horton et al. |
| 7,290,302 | B2 | 11/2007 | Sharps |
| 7,343,635 | B2 | 3/2008 | Jackson |
| 7,343,916 | B2 | 3/2008 | Biondo et al. |
| 7,496,980 | B2 | 3/2009 | Sharps |
| 7,520,007 | B2 | 4/2009 | Skripps |
| 7,520,008 | B2 | 4/2009 | Wong et al. |
| 7,565,708 | B2 | 7/2009 | Jackson |
| 7,600,281 | B2 | 10/2009 | Skripps |
| 7,653,953 | B2 | 2/2010 | Lopez-Sansalvador et al. |
| 7,669,262 | B2 | 3/2010 | Skripps |
| 7,681,269 | B2 | 3/2010 | Biggie et al. |
| 7,694,369 | B2 | 4/2010 | Hinders et al. |
| 7,739,762 | B2 | 6/2010 | Lamb |
| 7,810,185 | B2 | 10/2010 | Burstner et al. |
| 7,824,353 | B2 | 11/2010 | Matta |
| 7,861,720 | B1 | 1/2011 | Wolcott |
| 7,882,583 | B2 | 2/2011 | Skripps |
| 7,931,607 | B2 | 4/2011 | Biondo et al. |
| 7,954,996 | B2 | 6/2011 | Boomgaarden et al. |
| D645,967 | S | 9/2011 | Sharps |
| 8,020,227 | B2 | 9/2011 | Dimmer et al. |
| 8,042,208 | B2 | 10/2011 | Gilbert et al. |
| 8,056,163 | B2 | 11/2011 | Lemire |
| 8,060,960 | B2 | 11/2011 | Jackson |
| 8,118,029 | B2 | 2/2012 | Gneiting et al. |
| D663,427 | S | 7/2012 | Sharps |
| D665,912 | S | 8/2012 | Skripps |
| 8,234,730 | B2 | 8/2012 | Skripps |
| 8,234,731 | B2 | 8/2012 | Skripps |
| 8,256,050 | B2 | 9/2012 | Wong et al. |
| 8,286,283 | B2 | 10/2012 | Copeland et al. |
| D676,971 | S | 2/2013 | Sharps |
| 8,381,331 | B2 | 2/2013 | Sharps et al. |
| 8,397,323 | B2 | 3/2013 | Skripps et al. |
| D683,032 | S | 5/2013 | Sharps |
| 8,464,375 | B1 | 6/2013 | Jorgensen et al. |
| 8,486,068 | B2 | 7/2013 | Starr |
| 8,555,439 | B2 | 10/2013 | Soto et al. |
| 8,584,281 | B2 | 11/2013 | Diel et al. |
| 8,590,074 | B2 | 11/2013 | Hornbach et al. |
| 8,635,725 | B2 | 1/2014 | Tannoury et al. |
| 8,676,293 | B2 | 3/2014 | Breen et al. |
| 8,677,529 | B2 | 3/2014 | Jackson |
| 8,707,476 | B2 | 4/2014 | Sharps |
| 8,707,484 | B2 | 4/2014 | Jackson et al. |
| 8,719,979 | B2 | 5/2014 | Jackson |
| 8,732,876 | B2 | 5/2014 | Lachenbruch et al. |
| 8,763,178 | B1 | 7/2014 | Martin et al. |
| 8,777,878 | B2 | 7/2014 | Deitz |
| 8,782,832 | B2 | 7/2014 | Blyakher et al. |
| 8,806,679 | B2 | 8/2014 | Soto et al. |
| 8,826,474 | B2 | 9/2014 | Jackson |
| 8,826,475 | B2 | 9/2014 | Jackson |
| 8,833,707 | B2 | 9/2014 | Steinberg et al. |
| 8,839,471 | B2 | 9/2014 | Jackson |
| 8,844,077 | B2 | 9/2014 | Jackson et al. |
| 8,845,264 | B2 | 9/2014 | Kubiak et al. |
| 8,856,986 | B2 | 10/2014 | Jackson |
| 8,864,205 | B2 | 10/2014 | Lemire et al. |
| 8,893,333 | B2 | 11/2014 | Soto et al. |
| D720,076 | S | 12/2014 | Sharps et al. |
| 8,938,826 | B2 | 1/2015 | Jackson |
| 8,978,180 | B2 | 3/2015 | Jackson |
| 8,997,286 | B2 | 4/2015 | Wyslucha et al. |
| 9,119,610 | B2 | 9/2015 | Matta et al. |
| 9,180,062 | B2 | 11/2015 | Jackson |
| 9,205,013 | B2 | 12/2015 | Jackson |
| 9,211,223 | B2 | 12/2015 | Jackson |
| 9,233,037 | B2 | 1/2016 | Sharps et al. |
| 9,289,342 | B2 | 3/2016 | Jackson |
| 9,295,433 | B2 | 3/2016 | Jackson et al. |
| 9,308,145 | B2 | 4/2016 | Jackson |
| 9,339,430 | B2 | 5/2016 | Jackson et al. |
| 9,364,380 | B2 | 6/2016 | Jackson |
| 9,498,397 | B2 | 11/2016 | Hight et al. |
| 10,363,189 | B2 | 7/2019 | Hight et al. |

(56) References Cited

U.S. PATENT DOCUMENTS

| | | | |
|---|---|---|---|
| 11,096,853 | B2 | 8/2021 | Hight et al. |
| 2002/0138903 | A1 | 10/2002 | Simmons et al. |
| 2004/0133983 | A1 | 7/2004 | Newkirk et al. |
| 2005/0155149 | A1 | 7/2005 | Pedersen |
| 2005/0235415 | A1 | 10/2005 | Pedersen et al. |
| 2006/0123552 | A1 | 6/2006 | Ben-Levi |
| 2008/0000028 | A1 | 1/2008 | Lemire et al. |
| 2009/0044813 | A1 | 2/2009 | Gneiting et al. |
| 2009/0126116 | A1 | 5/2009 | Lamb et al. |
| 2009/0205139 | A1 | 8/2009 | Van Deursen et al. |
| 2009/0282614 | A1 | 11/2009 | Jackson |
| 2010/0192300 | A1 | 8/2010 | Tannoury et al. |
| 2011/0107516 | A1* | 5/2011 | Jackson ................. A61G 13/04 5/608 |
| 2012/0144589 | A1 | 6/2012 | Skripps |
| 2012/0198625 | A1 | 8/2012 | Jackson |
| 2013/0111666 | A1 | 5/2013 | Jackson |
| 2013/0205500 | A1 | 8/2013 | Jackson |
| 2013/0219623 | A1 | 8/2013 | Jackson |
| 2013/0254995 | A1 | 10/2013 | Jackson |
| 2013/0254996 | A1 | 10/2013 | Jackson |
| 2013/0254997 | A1 | 10/2013 | Jackson |
| 2013/0312181 | A1 | 11/2013 | Jackson et al. |
| 2013/0312187 | A1 | 11/2013 | Jackson |
| 2013/0312188 | A1 | 11/2013 | Jackson |
| 2013/0326813 | A1 | 12/2013 | Jackson |
| 2014/0007349 | A1 | 1/2014 | Jackson |
| 2014/0020181 | A1 | 1/2014 | Jackson |
| 2014/0033436 | A1 | 2/2014 | Jackson |
| 2014/0068861 | A1 | 3/2014 | Jackson et al. |
| 2014/0082842 | A1 | 3/2014 | Jackson |
| 2014/0109316 | A1 | 4/2014 | Jackson et al. |
| 2014/0173826 | A1 | 6/2014 | Jackson |
| 2014/0196212 | A1 | 7/2014 | Jackson |
| 2014/0201913 | A1 | 7/2014 | Jackson |
| 2014/0201914 | A1 | 7/2014 | Jackson |
| 2014/0208512 | A1 | 7/2014 | Jackson |
| 2014/0317847 | A1 | 10/2014 | Jackson |
| 2014/0325759 | A1 | 11/2014 | Bly |
| 2015/0059094 | A1 | 3/2015 | Jackson |
| 2015/0150743 | A1 | 6/2015 | Jackson |
| 2015/0283017 | A1 | 10/2015 | Harris, Jr. |
| 2016/0000621 | A1 | 1/2016 | Jackson et al. |
| 2016/0000626 | A1 | 1/2016 | Jackson et al. |
| 2016/0000627 | A1 | 1/2016 | Jackson et al. |
| 2016/0000629 | A1 | 1/2016 | Jackson et al. |
| 2016/0361218 | A1 | 12/2016 | Dubois et al. |
| 2017/0112699 | A1 | 4/2017 | Hight et al. |
| 2019/0314236 | A1 | 10/2019 | Hight et al. |

FOREIGN PATENT DOCUMENTS

| | | |
|---|---|---|
| DE | 4039907 | 7/1991 |
| DE | 4429062 | 2/1996 |
| DE | 202008001952 | 5/2000 |
| DE | 19723927 | 5/2003 |
| DE | 10158470 | 6/2003 |
| EP | 0501712 | 2/1992 |
| EP | 0617947 | 1/1995 |
| EP | 1210049 | 6/2002 |
| EP | 1686944 | 8/2006 |
| EP | 1159947 | 9/2006 |
| EP | 1982680 | 10/2008 |
| FR | 2247194 | 5/1975 |
| GB | 2210554 | 6/1989 |
| JP | 2001-112582 | 4/2001 |
| WO | 2004/026212 | 4/2004 |
| WO | 2006/006106 | 1/2006 |
| WO | 2006/061606 | 6/2006 |
| WO | 2009/054969 | 4/2009 |
| WO | WO 2009/071787 | 6/2009 |
| WO | 2011/162803 | 12/2011 |

OTHER PUBLICATIONS

Extended European Search Report for European Patent Application No. 16194763.5 dated Mar. 22, 2017 (7 pages).

Extended European Search Report for European Patent Application No. 18196057.6 dated Dec. 19, 2018 (7 pages).

* cited by examiner

SURGICAL PATIENT SUPPORT FOR LATERAL-TO-PRONE PATIENT POSITIONING

The present application is a continuation of U.S. application Ser. No. 16/451,446, filed Jun. 25, 2019, now U.S. Pat. No. 11,096,853, which is a continuation of U.S. application Ser. No. 15/290,156, filed Oct. 11, 2016, now U.S. Pat. No. 10,363,189, which claims the benefit, under 35 U.S.C. § 119 (e), of U.S. Provisional Application No. 62/352,711, filed Jun. 21, 2016, and of U.S. Provisional Application No. 62/245,646, filed Oct. 23, 2015, and each of which is hereby incorporated by reference herein in its entirety.

BACKGROUND

The present disclosure relates to patient support devices and methods of operating patient support devices. More specifically, the present disclosure relates to surgical patient supports and methods of operating surgical patient supports.

Patient supports devices, for example, those of surgical patient supports can provide support to patient's bodies to provide surgical access to surgical sites on the patient's body. Providing surgical access to surgical sites on a patient's body promotes favorable surgical conditions and increases the opportunity for successful results.

Positioning the patient's body in one particular manner can provide a surgical team preferred and/or appropriate access to particular surgical sites, while other body positions may provide access to different surgical sites or different access to the same surgical site. As a surgical patient is often unconscious during a surgery, a surgical team may arrange a patient's body in various positions throughout the surgery. Surgical patient supports, such as operating tables, that accommodate a certain patient body position can provide surgical access to certain surgical sites while safely supporting the patient's body.

SUMMARY

The present application discloses one or more of the features recited in the appended claims and/or the following features which, alone or in any combination, may comprise patentable subject matter:

According to an aspect of the disclosure, a surgical patient support device may include a support frame having first and second support rails extending parallel to each other from a head end to a foot end of the patient support, a head-cross beam and a foot-cross beam connected to each of the support rails at the head end and foot end respectively, and a connection arm engaged with the head-cross beam, a platform mounted on the frame and including a torso section and a leg section, an actuator assembly coupled to the support frame and configured to support the leg section, and the leg section may be configured to move between a raised position and a lowered position.

In some embodiments, the first and second support rails each may include a torso rail and a leg rail, the torso rails each extending from the head-cross beam towards the foot end to connect with the leg rail of the respective support rail, and each leg rail extending from connection with the torso rail of the respective support rail towards the foot end.

In some embodiments, each leg rail may include a first sub-rail and a second sub-rail, and each first sub-rail may extend from connection with the torso rail of the respective support rail towards the foot end at an angle relative to the torso rail of the respective support rail.

In some embodiments, each first sub-rail may extend from connection with the torso rail of the respective support rail towards the foot end at an angle of about 15 to about 35 degrees relative to the torso rail of the respective support rail.

In some embodiments, each second sub-rail may extend from connection with the foot-cross beam for connection with the first sub-rail of the respective support rail. In some embodiments, in the lowered position the leg section of the platform may be parallel to each first sub-rail.

In some embodiments, the actuator assembly may include at least one linear actuator configured for movement between a retracted position and an extended position to move the leg section of the support platform between the lowered position and the raised position.

In some embodiments, the at least one actuator may include a cross link that extends between the leg rails of the support rails and a cross arm extending orthogonally from the cross link to support the at least one linear actuator. In some embodiments, the at least one linear actuator may be pivotably connected to the cross arm of the cross link.

In some embodiments, each leg rail may include a jogged section that connects with the torso rail and a width defined between the leg rails of the support rails including the jogged section is wider than a width defined between the torso rails of the support rails.

In some embodiments, the actuator assembly may be connected to the leg section of the platform on a bottom side thereof at a position spaced apart from the head end and the foot end.

In some embodiments, the actuator assembly may include at least two actuators and a first of the at least two actuators is pivotably coupled to one of the support rails and a second of the at least two actuators is pivotably coupled to the other of the support rails, and each of the at least two actuators is pivotably coupled to the leg section of the platform and is configured for actuation to move the leg section of the support platform between the lowered and the raised positions.

According to another aspect of the present disclosure, a surgical patient support system may include a base frame having a head elevator tower and a foot elevator tower each having a support bracket connected thereto and configured for translation of the support brackets between higher and lower positions; a support frame having first and second support rails extending parallel to each other from a head end to a foot end, a head-cross beam and a foot-cross beam extending between the first and second rails at the head end and foot end respectively; and connection arms including a head-connection arm engaged with the head-cross beam and coupled with the support bracket of the head tower and a leg-connection arm engaged with the leg-cross beam and coupled with the support bracket of the leg tower; a support platform coupled to the support frame and including a torso section and a leg section; an actuator assembly coupled to the support frame and configured to support the leg section; and the leg section is configured to move between a raised position and a lowered position to create leg break of a surgical patient in a lateral position.

In some embodiments, the leg section of the support platform may be hingedly attached to the support frame to move between the raised position and the lowered position and the actuator assembly is pivotably connected to the leg section of the platform on a bottom side thereof.

In some embodiments, the actuator assembly may be configured for operation between an extended and a retracted position and the extended position of the actuator assembly corresponds to the raised position of the leg section, and the retracted position of the at least one actuator corresponds to the lowered position of the leg section.

In some embodiments, the lowered position may be arranged to contribute about 25° of leg break to a surgical patient in the lateral position. In some embodiments, the raised position may be arranged to contribute about 0° of leg break to a surgical patient in the lateral position. In some embodiments, the actuator assembly may include a linear actuator configured to rotate an axle.

In some embodiments, the first and second rails may each include a torso rail which extends from the head end towards the foot end and the first and second rails define a constant width between the torso rails along the extension direction.

According to another aspect of the present disclosure, a method of operating a surgical patient support may include transferring a patient onto the surgical patient support while maintaining a supine position, positioning the patient in a lateral position on the surgical patient support to permit access to the patient, operating the surgical patient support to provide leg break to the patient, and rotating the patient into a prone position while the surgical patient support remains rotationally fixed.

In some embodiments, the method may include operating the surgical patient support to provide leg break to the patient includes lowering a leg section of a support platform of the surgical patient support to have an angle of between 0-35° with respect to a torso section of the support platform.

According to another aspect of the disclosure, a surgical patient support extending from a head end to a foot end may include a support frame having first and second support rails extending parallel to each other between the head end and the foot end, a head-cross beam and a foot-cross beam connected to each of the support rails at the head end and foot end respectively, and a connection arm engaged with the head-cross beam, the first and second support rails each including a torso rail and a leg rail, the torso rails each extending from the head-cross beam towards the foot end to connect with the leg rail of the respective support rail, and each leg rail extends from connection with the torso rail of the respective support rail towards the foot end, each leg rail includes a first sub-rail and a second sub-rail, and each first sub-rail extends from connection with the torso rail of the respective support rail towards the foot end at an angle relative to the torso rail of the respective support rail and each second sub-rail extends from connection with the foot-cross beam for connection with the first sub-rail of the respective support rail, a platform mounted on the support frame and including a torso section and a leg platform including a pivot end pivotably attached to the frame and a footward end proximate to the foot end of the patient support, the leg platform being configured to move between a raised position in which the leg platform is generally parallel with the torso platform and a lowered position in which the leg platform is pivoted out of parallel with the torso platform, an actuator assembly coupled to the support frame and configured to support the leg platform, and a protection sheath coupled to the second sub-rail of each of the leg rails to block against pinch point formation during movement of the leg platform.

In some embodiments, the protection sheath may include a tray extending between opposite ends and an arm attached to each of the opposite ends of the tray. In some embodiments, the tray may be formed to have a shape that corresponds closely to the travel path of the leg platform between the raised and lowered positions to prevent pinch points.

In some embodiments, the arms may each define an opening and a cavity extending from the opening into the respective arm, each arm being configured to receive one of the second sub-rails through the respective opening and into the respective cavity.

In some embodiments, the tray may include an opening defined on a rear side thereof and a cavity extending from the opening into the tray for receiving the foot-cross beam therein.

In some embodiments, the connection arm may extend through the opening in the tray. In some embodiments, the cavities of the arms may connect with the cavity of the tray.

In some embodiments, each first sub-rail may extend from connection with the torso rail of the respective support rail towards the foot end at an angle of about 15 to about 35 degrees relative to the torso rail of the respective support rail. In some embodiments, in the lowered position the leg platform of the platform may be parallel to the first sub-rails.

According to another aspect of the present disclosure, a surgical patient support may include a pair of elevator towers, a support frame extending between a head end and a foot end and coupled to one of the support towers at each end, the support frame including first and second support rails, a head-cross beam and a foot-cross beam connected to each of the support rails at the head end and foot end respectively, and a connection arm engaged with the head-cross beam, the first and second support rails each including a torso rail and a leg rail, the torso rails each extending from the head-cross beam towards the foot end to connect with the leg rail of the respective support rail, and each leg rail extends from connection with the torso rail of the respective support rail towards the foot end, each leg rail includes a first sub-rail and a second sub-rail, and each first sub-rail extends from connection with the torso rail of the respective support rail towards the foot end at an angle relative to the torso rail of the respective support rail and each second sub-rail extends from connection with the foot-cross beam for connection with the first sub-rail of the respective support rail, a platform mounted on the support frame and including a torso section and a leg section including a pivot end pivotably attached to the frame and a footward end proximate to the foot end of the patient support, the leg section being configured to move between a raised position in which the leg section is generally parallel with the torso section and a lowered position in which the leg section is pivoted out of parallel with the torso section, an actuator assembly coupled to the support frame and configured to support the leg section, and a protection sheath coupled to the second sub-rail of each of the leg rails to block against pinch point formation during movement of the leg section.

In some embodiments, the protection sheath may include a tray extending between opposite ends and an arm attached to each of the opposite ends of the tray.

In some embodiments, the tray may be formed to have a shape that corresponds closely to the travel path of the leg section between the raised and lowered positions to prevent pinch points.

In some embodiments, the arms may each define an opening and a cavity extending from the opening into the respective arm, each arm being configured to receive one of the second sub-rails through the respective opening and into the respective cavity.

In some embodiments, the tray may include an opening defined on a rear side thereof and a cavity extending from the opening into the tray for receiving the foot-cross beam therein.

In some embodiments, the connection arm may extend through the opening in the tray. In some embodiments, the cavities of the arms may connect with the cavity of the tray.

In some embodiments, each first sub-rail may extend from connection with the torso rail of the respective support rail towards the foot end at an angle of about 15 to about 35 degrees relative to the torso rail of the respective support rail. In some embodiments, in the lowered position the leg section of the platform may be parallel to each first sub-rail.

These and other features of the present disclosure will become more apparent from the following description of the illustrative embodiments.

BRIEF DESCRIPTION OF THE DRAWINGS

The detailed description particularly refers to the accompanying figures in which.

DETAILED DESCRIPTION OF THE DRAWINGS

Figure 1:
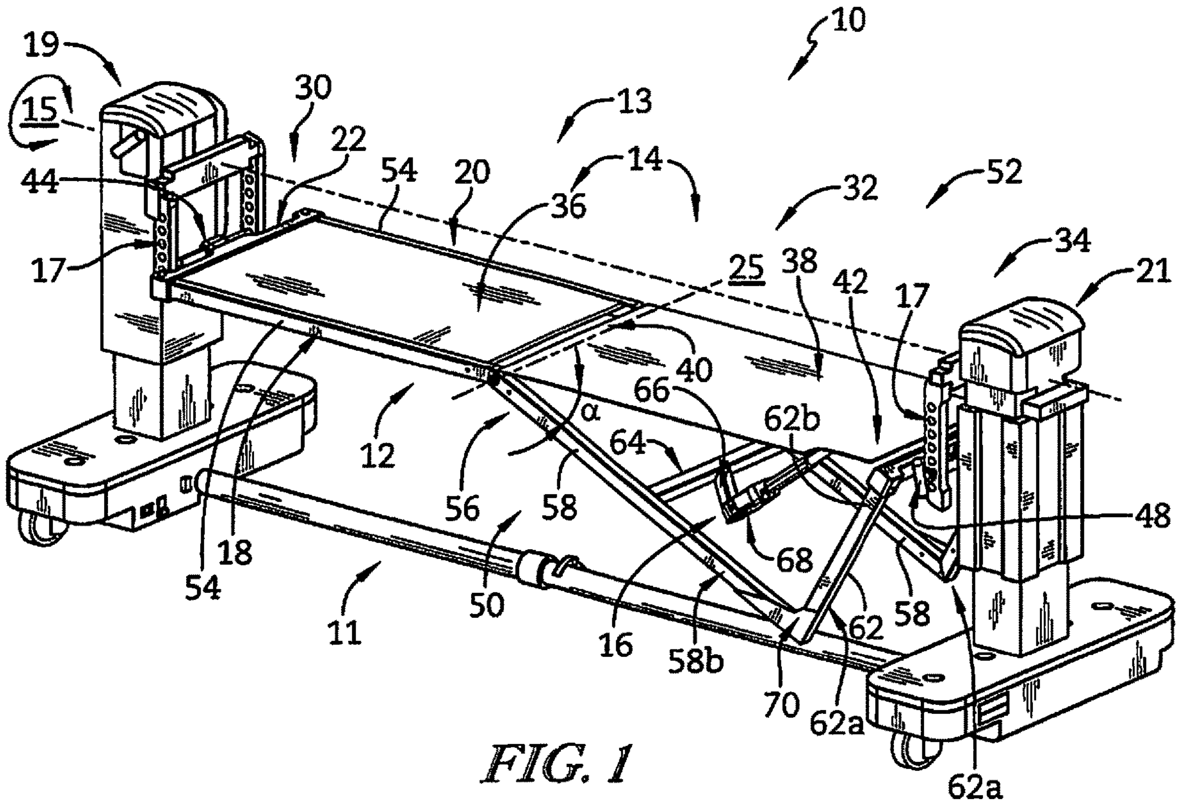
FIG. 1 is a top perspective view of a surgical support including a patient support having a leg platform in a raised position.

For the purposes of promoting an understanding of the principles of the disclosure, reference will now be made to a number of illustrative embodiments illustrated in the drawings and specific language will be used to describe the same.

Some surgical procedures, such as spinal fusion procedures, require particular access to various parts of a patient's spine. The course of a surgery can require a patient's body to be positioned for a period of time in several different manners, for example a lateral position for a lateral lumbar interbody fusion and a prone position for a posterior spinal fusion.

For surgical procedures that are performed in the lateral body position (e.g., lateral lumbar interbody fusion), it can be desirable to articulate the patient's legs out of the sagittal plane along the coronal plane such that the patient's legs are generally out of parallel with the patient's torso, referred to as leg break. This leg break can provide appropriate access to certain surgical sites, for example certain lumbar areas. The present disclosure includes, among other things, surgical supports for accommodating various positions of a patient's body, including for example a lateral position with leg break and a prone position.

In a first illustrative embodiment, a surgical support 10 includes a patient support 13 and a base 11 as shown in FIG. 1. Base 11 supports patient support 13 above the floor to provide support to a surgical patient. Patient support 13 includes a frame 12, a support platform 14, and an actuator assembly 16.

As shown in FIG. 1, frame 12 supports platform 14 that can support a patient, generally with padding disposed between the patient and the platform 14 for comfort. The patient support 13 includes a head end 30, a mid-section 32, a foot end 34, and left and right lateral sides 50, 52. Patient support 13 is configured to permit movement of the support platform 14 near the foot end 34 to provide leg break to a patient occupying the surgical support 10.

Base 11 includes elevator towers 19, 21 as shown in FIG. 1. Elevator towers 19, 21 each include a bracket 17 and provide support to the frame 12 for vertical translation along the towers 19, 21. Bracket 17 of elevator tower 19 is connected to frame 12 of patient support 13 at head end 30, and bracket 17 of elevator tower 21 is connected to frame 12 of the patient support 13 at foot end 34.

Frame 12 includes support rails 18, 20 and first and second beams 22, 24 as shown in FIG. 1. Frame 12 is illustratively comprised of tubular members, but in some embodiments may include any one or more of solid, truss, and/or any combination of frame members. First beam 22 is illustratively arranged at the head end 30 and second beam 24 is arranged at the foot end 34 of the patient support 13. Support rails 18, 20 extend parallel to each other between beams 22, 24 from the head end 30 to the foot end 34 of the patient support 13.

Support rail 18 illustratively connects with beam 22 on the left lateral side 50 (as depicted in FIG. 1) of patient support 13 and extends footward to connect with beam 24 on the same lateral side 50 as shown in FIG. 1. Support rail 20 illustratively connects with beam 22 on the right lateral side 52 (as depicted in FIG. 1) of patient support 13 and extends footward to connect with beam 24 on the same lateral side 52 as shown in FIG. 1. Frame 12 is configured to support the support platform 14.

Support platform 14 illustratively includes a torso platform 36 and a leg platform 38 as shown in FIG. 1. Torso platform 36 extends from head end 30 to mid-section 32 of patient support 13. Leg platform 38 extends from the mid-section 32 to the foot end 34 of the patient support 13.

Figure 2:
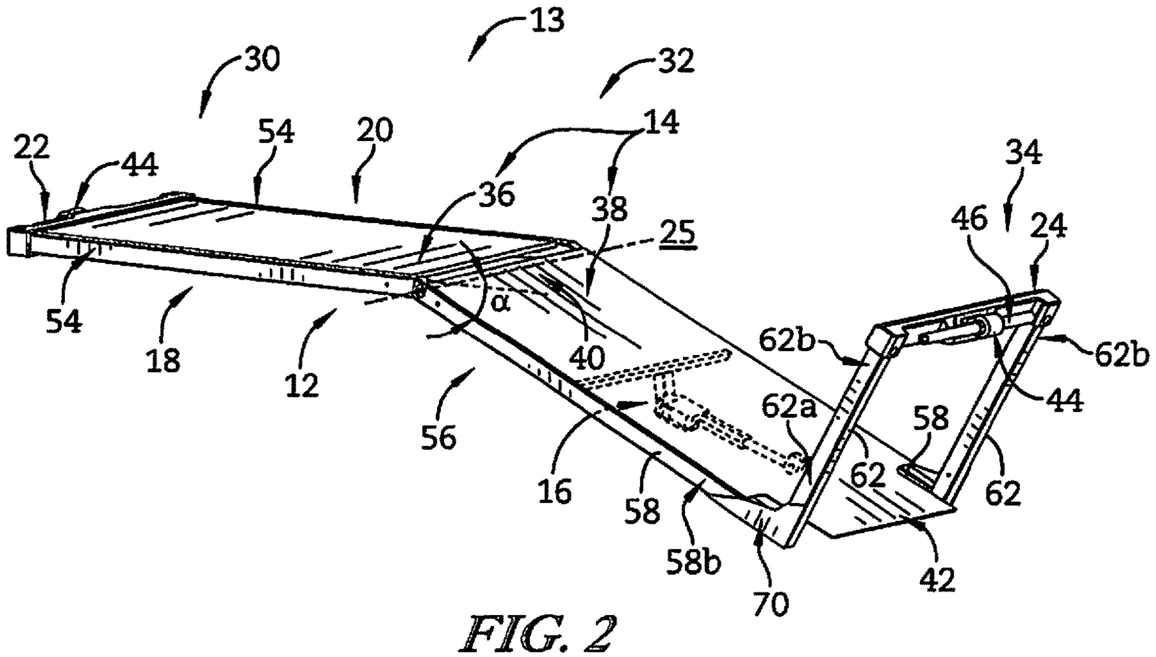
FIG. 2 is a top perspective view of the patient support of the surgical support as shown in FIG. 1 showing the leg platform in a lowered position.
Figure 3:
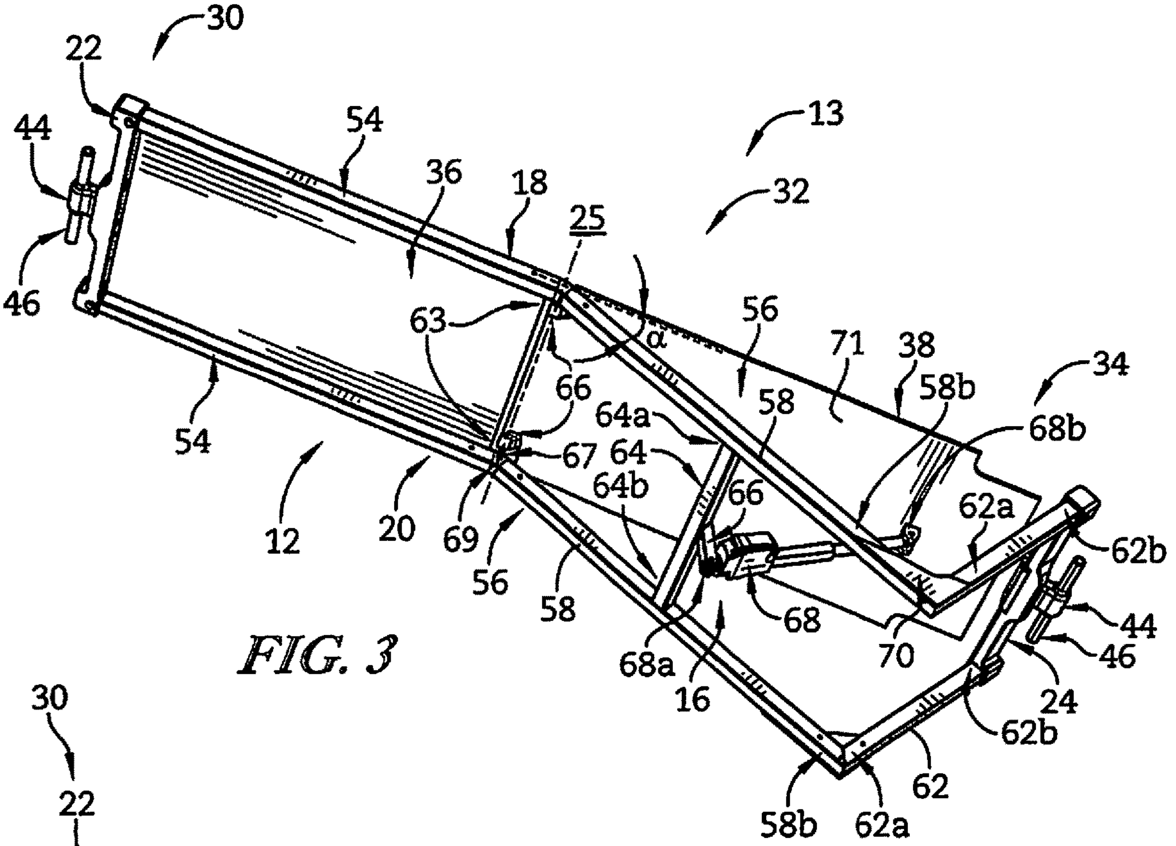
FIG. 3 is a bottom perspective view of the patient support of the surgical support as shown in FIG. 1.
Figure 4:
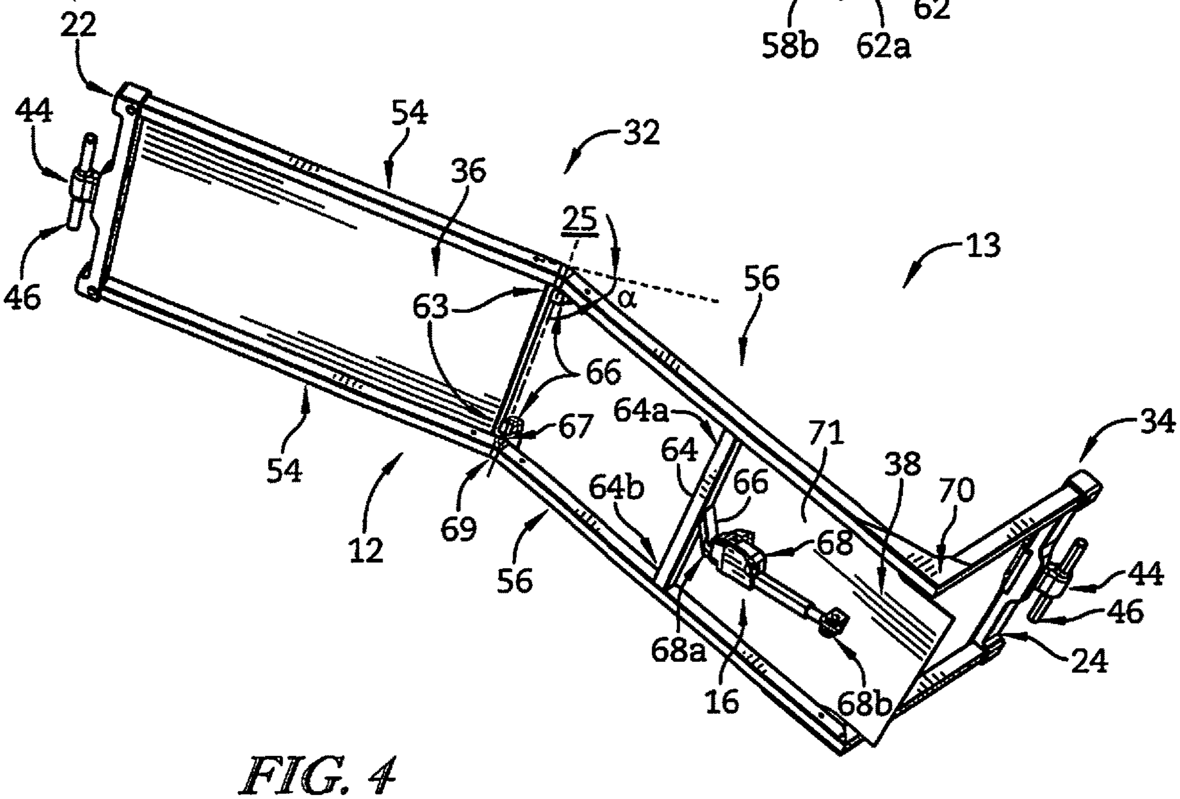
FIG. 4 is a bottom perspective view of the patient support of the surgical support as shown in FIG. 2.

Leg platform 38 is hingedly supported by frame 12 to pivot about an axis 25 extending laterally through surgical support 10 such that a footward end 42 of leg platform 38 is lowered relative to its headward end 40 to provide leg break to an occupying patient as shown in FIGS. 1-4. Axis 25 is illustratively spaced apart from and perpendicular and/or orthogonal to axis 15. In the illustrative embodiment as shown in FIGS. 1-4, headward end 40 is hingedly connected to frame 12, but footward end 42 of leg platform 38 is a free end having no direct connection with any support structure, for example, footward end 42 illustratively has no direct structural connection to frame 12, bracket 17, and/or tower 21. In the illustrative embodiment as shown in FIGS. 3 and 4, leg platform 38 includes hinged connections 63 each including a hinge block 65 and a hinge post 67.

Hinge blocks 65 are illustratively attached to a bottom side 71 of leg platform 38 at the headward end 40 thereof and in spaced apart relation to each other. One hinge post 67 illustratively extends from connection with one hinge block 65 in a direction away from the other hinge block 65 and parallel to the beams 22, 24. The other hinge post 67 illustratively extends from connection with the other hinge block 65 in a direction away from the one hinge block 65 and parallel to the beams 22, 24. One hinge post 67 is illustratively received in a bearing 69 of support rail 18 and the other hinge post 67 is illustratively received in a bearing 69 of support rail 20, to permit pivotable movement of the leg platform 38. In the illustratively embodiment, bearings 69 are embodied as plain bearings, but in some embodiments may include one or more of any suitable type of bearings, for example, roller bearings.

Actuator assembly 16 assists in driving the leg platform 38 for pivoting movement between a raised position (shown in FIG. 1) and a lowered position (shown in FIG. 2). During pivoting of leg platform 38 by actuator assembly 16, head platform 36 and all portions of frame 12 illustratively remain stationary.

As shown in the illustrative embodiment of FIGS. 1-4, support rails 18, 20 of the frame 12 are disposed at respective left and right sides 50, 52 of patient support 13 in spaced apart relation to each other. Each support rail 18, 20 includes a torso rail 54 and a leg rail 56. Each torso rail 54 extends from the head end 30 to the mid-section 32 of the support device 10.

The torso rails 54 are each illustratively embodied as straight rails extending in parallel spaced apart relation to each other. The torso rails 54 are illustratively connected to opposite lateral ends of beam 22 as shown in FIG. 1. Torso rails 54 on each lateral side 50, 52 connect to one leg rail 56 on the corresponding lateral side 50, 52 at the mid-section 32 of patient support 13. In the illustrative embodiment, torso rails 54 are connected to their respective leg rails 56 by rigid connection such that rails 54, 56 do not move relative to each other.

Each leg rail 56 extends from the mid-section 32 to the foot end 34 of patient support 13 as shown in FIGS. 1 and 2. Each leg rail 56 illustratively connects to one corresponding torso rail 56 at the mid-section 32 of patient support 13. Each leg rail 56 includes a first sub-rail 58 and a second sub-rail 62 as shown in FIGS. 1 and 2.

In the illustrative embodiment, first sub-rail 58 of first rail 18 extends from mid-section 32 toward foot end 34 at angle $\alpha$ relative to its corresponding torso rail 54 of the same first rail 18. In the illustrative embodiment, the first sub-rail 58 is straight and extends at angle $\alpha$ of about 25 degrees relative to its corresponding torso rail 54 of first rail 18. In the illustrative embodiment, first sub-rail 58 of second rail 20 extends from the mid-section 32 toward the foot end 34 at angle $\alpha$ relative to the torso rail 54 of second rail 20. In the illustrative embodiment, first sub-rail 58 of second rail 20 is straight and extends at angle $\alpha$ of about 25 degrees relative to its corresponding torso rail 54 of second rail 20.

As illustratively suggested in FIG. 1, the angle $\alpha$ of each first sub-rail 58 is downward relative to their respective torso rails 54, however, the indication of the relative direction downward is descriptive and is not intended to limit the orientation of the frame 12 of the support device 10. In some embodiments, the first sub-rail 58 of each first and second rails 18, 20 may have any angle relative to its corresponding torso rail 54 including but not limited to any angle within the range 0-40 degrees.

Second sub-rails 62 are arranged in parallel spaced apart relation to each other as suggested in FIG. 1. In the illustrative embodiment, second sub-rail 62 of first rail 18 is straight and is connected at its headward end 62*a* to a footward end 58*b* of the first sub-rail 58 of first rail 18 as shown in FIGS. 1 and 2. Second sub-rail 62 of second rail 20 is straight and is connected at its headward end 62*a* to a footward end 58*b* of the first sub-rail 58 of second rail 20 as shown in FIGS. 1 and 2. Second sub-rails 62 are connected on their footward ends 62*b* to opposite ends of beam 24.

In the illustrative embodiments shown in FIGS. 1 and 2, first and second sub-rails 58, 62 of the same one of first and second rails 18, 20 are embodied as each being welded to each other and also to a reinforcement plate 70. In some embodiments, first and second sub-rails 58, 62 of the same one of first and second rails 18, 20 are connected to each other and/or to plate 70 by one or more of welding, brazing, integral formation, pinning, bolting, and/or any other suitable manner of joining. In some embodiments, additional sub-rails connect the first sub-rail 58 to the second sub-rail 62 for the same first and second rail 18, 20, for example, a third sub-rail may connect to the footward end 58*b* of the first sub-rail of one of the first and second rails 18 and the headward end 62*a* of the second sub-rail 62 of the same one of the first rail and second rail 18.

In the illustrative embodiment as shown in FIGS. 1, 3, and 4, actuator assembly 16 is connected between frame 12 and platform 14 to provide movement and positioning of platform 14 relative to the torso platform 36. As shown in FIG. 3, actuator assembly 16 illustratively includes an actuator 68, a cross link 64, and a cross arm 66. Cross link 64 connects to frame 12.

Cross link 64 includes a first end 64*a* and a second end 64*b* as shown in FIG. 3. Cross link 64 illustratively connects at its first end 64*a* to first support rail 18 and extends to a second end 64*b* that connects to second support rail 20. Cross link 64 is illustratively embodied as arranged parallel to beams 22, 24 and connecting on either end 64*a*, 64*b* to the first sub-rails 58. In some embodiments, cross link 64 may connect to any portion of the frame 12 suitable to provide support to actuator 68. Cross link 64 supports cross arm 66.

Cross arm 66 illustratively connects to the cross link 64 as shown in FIGS. 1-4. Cross arm 66 illustratively connects to cross link 64 about midway between lateral sides 50, 52 of patient support 13 and extends from cross link 64 in a direction generally away from the platform 14 to support actuator 68. In the illustrative embodiment, cross arm 66 comprises two plates each connected to cross link 64 at one end and connected at their other end by pinned connection to actuator 68. In some embodiments, cross link 64 and/or cross arm 66 may include one or more of a tubular member, solid member, truss member, and/or any combination thereof to support actuator 68 for moving the leg platform 38 between the raised and lowered positions.

Actuator 68 illustratively includes a first end 68*a* pivotably connected to the cross arm 66 and a second end 38*b* pivotably connected to leg platform 38 as shown in FIGS. 3 and 4. In the illustrative embodiment, actuator 68 is pivotably attached to a bottom side 71 of leg platform 38 by a pinned connection. Actuator 68 is illustratively embodied as a linear actuator configured to move between retracted (FIG. 4) and extended (FIG. 3) positions. Actuator 68 is illustratively embodied as an electro-mechanical actuator powered by an electric motor, for example, a suitable actuator is Actuator LA23 available from LINAK U.S. Inc. of Louisville, Kentucky.

In some embodiments, actuator 68 may include one or more of a mechanical, hydraulic, pneumatic, any/or any other type of actuator suitable for assisting movement of the leg platform 38 between raised and lowered positions. In some embodiments, actuator 68 may be attached by one or more of a hinge, ball joint, and/or any type of connection to provide support to actuator 68 for moving the leg platform 38 between the raised and lowered positions. Actuator 68 is configured to drive the leg platform 38 for pivoting movement between the raised (FIG. 4) and lowered (FIG. 3) positions to create leg break to a patient occupying patient support 13.

Figure 5A:
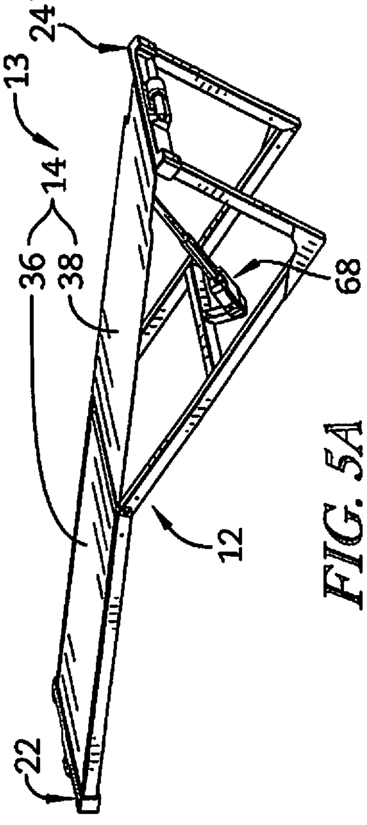
FIG. 5A is a top perspective view of the patient support of the surgical support as shown in FIG. 1 showing that an actuator is extended to support the leg platform in the raised position.
Figure 5B:
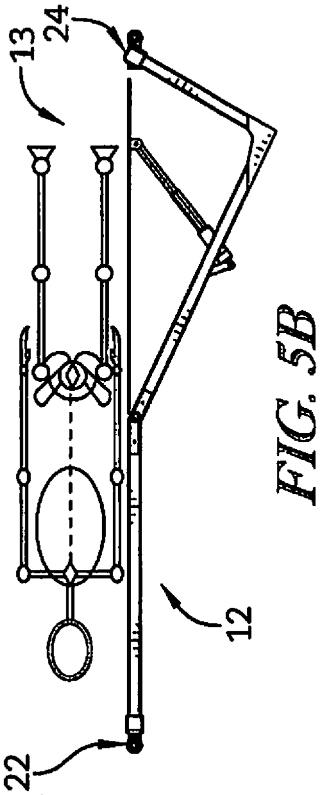
FIG. 5B is an elevation view of the patient support of the surgical support as shown in FIG. 1 showing that in the raised position the patient's spine is generally aligned.

As shown in FIGS. 5A-7B, actuator 68 is illustratively configured to operate between extended and retracted positions to pivotably move leg platform 38 between raised and lowered positions to create leg break to a patient occupying patient support 13. As shown in FIGS. 5A and 5B, leg platform 38 is arranged in the raised positioned when actuator 68 is in the extended positioned. In the illustrative embodiment as shown in FIGS. 5A and 5B, in the raised position, leg platform 38 is arranged generally coplanar with torso platform 36. In some embodiments, the raised position of leg platform 38 may include a slight angle with respect to torso platform, for example, an angle in the range of about −5 to about 5 degrees. In the illustrative embodiment as shown in FIG. 5B, in the raised position of the leg platform 38, the patient's spine in generally aligned and creates little or no leg break.

Figure 6A:
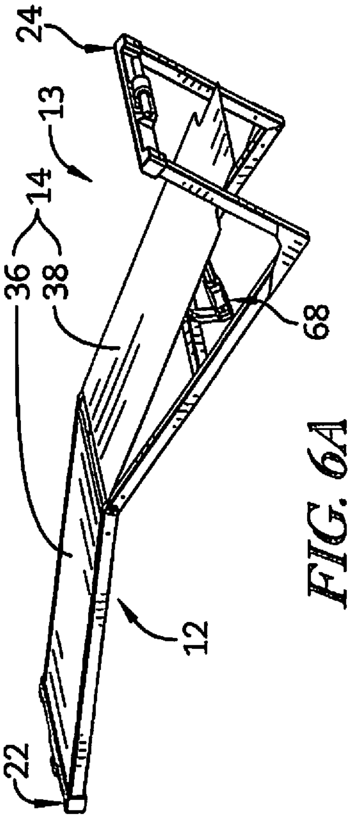
FIG. 6A is a top perspective view of the patient support of the surgical support as shown in FIG. 1 showing that the actuator is partly extended to support the leg platform in an intermediate position between raised and lowered positions.
Figure 6B:
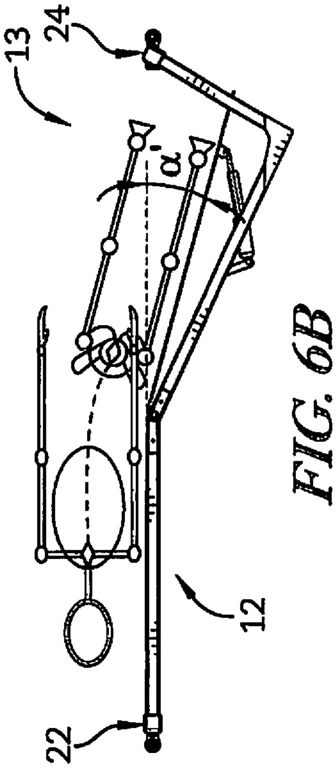
FIG. 6B is an elevation view of the patient support of the surgical support as shown in FIG. 1 showing that in the intermediate position the patient's spine is slightly not aligned to create some leg break.

As shown in FIGS. 6A and 6B, the leg platform 38 is arranged in an intermediate position which is defined between the lowered and raised positions. The leg platform 38 is arranged in the intermediate position when actuator 68 to is in an intermediate extension position which is defined between the retracted and extended positions of actuator 68. In the illustrative embodiment, in the intermediate position of the leg platform 38 as shown in FIGS. 6A and 6B, the leg platform 38 is generally arranged at an angle α', between about 0 and about 25 degrees, relative to the torso platform 36. In some embodiments, in the intermediate position, the leg platform 28 may be arranged at any angle α', between about −5 and about 40 degrees, relative to the torso platform 36. In the illustrative embodiment as shown in FIG. 6B, in the intermediate position of leg platform 28, the patient's spine is flexed, i.e., slightly not aligned, to create some leg break.

Figure 7A:
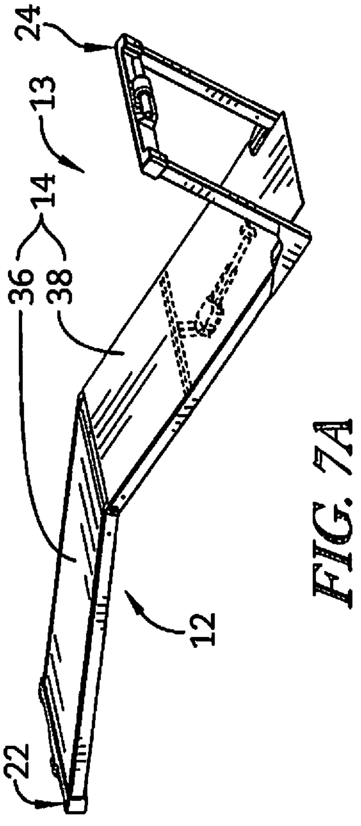
FIG. 7A is a top perspective view of the patient support of the surgical support as shown in FIG. 1 showing that the actuator is retracted to support the leg platform in lowered position.
Figure 7B:
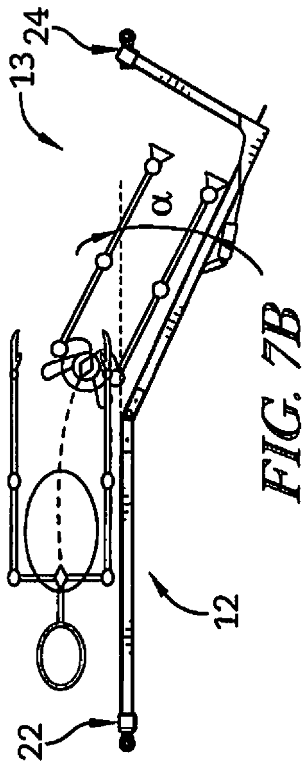
FIG. 7B is an elevation view of the patient support of the surgical support as shown in FIG. 1 showing that in the lowered position the patient's spine is not aligned to create full leg break.

As shown in FIGS. 7A and 7B, the leg platform 38 is arranged in the lowered position when actuator 68 is in the retracted position. In the illustrative embodiment, in the lowered position of the leg platform 38 as shown in FIGS. 7A and 7B, the leg platform 38 is generally arranged at an angle α equal to about 25 degrees, relative to the torso platform 36. In some embodiments, in the lowered position, the leg platform 38 may be arranged at any angle α from about 0 to about 40 degrees, relative to the torso platform 36. In the illustrative embodiment as shown in FIG. 7B, in the lowered position of leg platform 28, the patient's spine is not aligned, for example, greatly not aligned, to create full leg break.

Beams 22, 24 each couple to a floating arm 44 that is configured for connection to support towers 19, 21 via brackets 17 as shown in FIGS. 1-4. Each floating arm 44 is illustratively movably connected to its respective beam 22, 24 for pivoting movement to accommodate rotation of patient support 13 about axis 15 under configuration of frame 12 with different vertical positions of its head end 30 and foot end 34 without binding, although the present disclosure does not require rotation of the patient support 13.

Each floating arm 44 includes a connection tube 46. Connection tube 46 is connected to its floating arm 44 as shown in FIGS. 2-4. In the illustrative embodiment, connection tube 46 is a hollow cylinder connected at an intermediate point along its length to the floating arm 44 and configured to receive connection pin 48 therethrough to pin the floating arm 44 to bracket 17 of one of the elevator towers 19, 21 as suggested in FIG. 1. In some embodiments, the connection between frame 12 and bracket 17 may be configured similar to the motion coupler and its related components disclosed in U.S. Patent Application Publication No. 2013/0269710 by Hight et al., for example in FIGS. 41-44 and 69-73, and the contents of U.S. Patent Application Publication No. 2013/0269710 are hereby incorporated by reference including both the particulars of the motion coupler and its related components and the remainder of the disclosure in its entirety.

Figure 8:
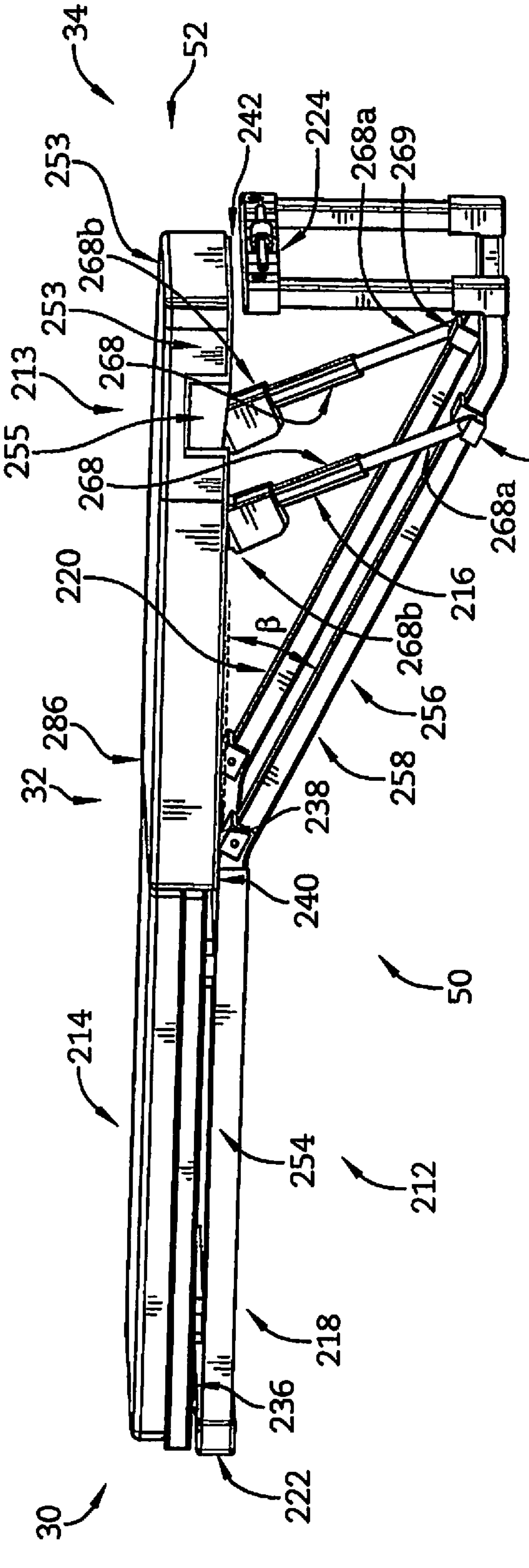
FIG. 8 is a top perspective view of a patient support of another illustrative embodiment of the surgical support having a leg platform in a raised position.
Figure 9:
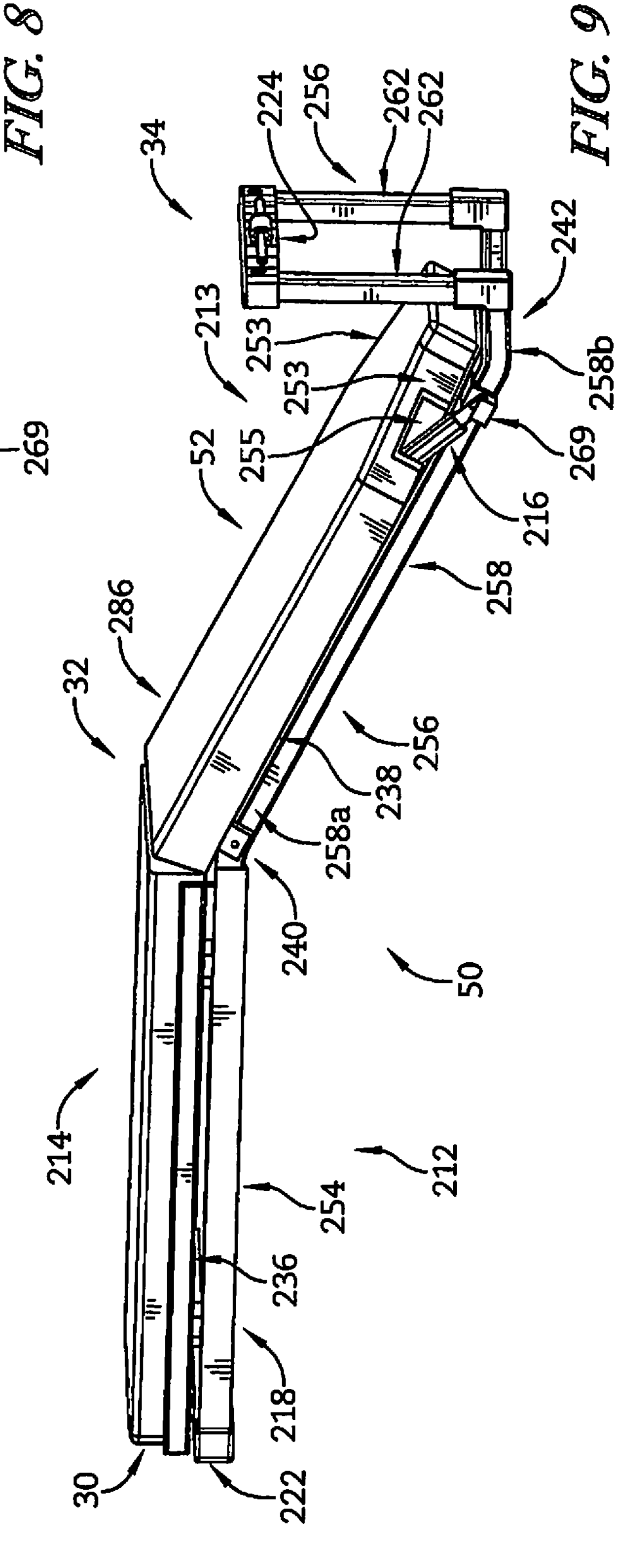
FIG. 9 is a top perspective view of the patient support as shown in FIG. 8 showing the leg platform in a lowered position.

Referring now to a second illustrative embodiment shown in FIGS. 8 and 9, a patient support 213 includes a frame 212, a platform 214, and an actuator assembly 216. Patient support 213 is configured for use in surgical support 10 and is similar in many respects to the patient support 13 shown in FIGS. 1-7 and described herein. Accordingly, similar reference numbers in the 200 series indicate features that are common between patient support 213 and patient support 13 unless indicated otherwise. The description of patient support 13 is equally applicable to patient support 213 except in instances when it conflicts with the specific description and drawings of patient support 213.

Frame 212 includes support rails 218, 220 and first and second beams 222, 224. Support rails 218, 220 extend parallel to each other between beams 222, 224 from the head end 30 to the foot end 34 of patient support 213.

Support rail 218 illustratively connects with beam 222 on the left lateral side 50 (as depicted in FIG. 8) of patient support 213 and extends footward to connect with beam 224 on the same lateral side 50 as shown in FIG. 8. Support rail 220 illustratively connects with beam 222 on the right lateral side 52 (as depicted in FIG. 8) of patient support 213 and extends footward to connect with beam 224 on the same lateral side 52 as shown in FIG. 8. Frame 212 is configured to support the support platform 214.

Support platform 214 illustratively includes a torso platform 236 and a leg platform 238 each having supporting padding 286 as shown in FIG. 8. Leg platform 238 is hingedly supported by frame 212 to pivot such that a footward end 242 of leg platform 238 is lowered relative to its headward end 240 to provide leg break to an occupying patient. Actuator assembly 216 assists in driving the leg platform 238 for pivoting movement between a raised position (shown in FIG. 8) and a lowered position (shown in FIG. 9). In the illustrative embodiment as shown in FIGS. 8 and 9, headward end 240 is hingedly connected to frame 212, but footward end 242 of leg platform 238 is a free end having no direct connection with any support structure, for example, footward end 242 illustratively has no direct structural connection to frame 212, bracket 17, and/or tower 21.

In the illustrative embodiment as shown in FIGS. 8 and 9, support rails 218, 220 of the frame 212 are disposed at respective left and right sides 50, 52 of patient support 213 in spaced apart relation to each other. Each support rail 218, 220 includes a torso rail 254 and a leg rail 256. Each torso rail 254 extends from the head end 30 to the mid-section 32 of patient support 13 to connect with its respective leg rail 256. In the illustrative embodiment, torso rails 254 are connected to their respective leg rails 256 by rigid connection such that rails 254, 256 do not move relative to each other.

Each leg rail 256 extends between the mid-section 32 to the foot end 34 of the patient support 213 as shown in FIGS. 8 and 9. Each leg rail 256 illustratively connects to a corresponding torso rail 256 at the mid-section 32 of the patient support 213. Each leg rail 256 includes a first sub-rail 258 and a second sub-rail 262 as shown in FIG. 8.

In the illustrative embodiment, each first sub-rail 258 of each support rail 218, 220 includes a first segment **258*a* and a second segment 258*b* as shown in FIG. 9. First segment 258*a* of each rail 258 illustratively extends from mid-section 32 towards foot end 34 at angle β relative to its corresponding torso rail 254 of the same rail 218, 220. First segment 258*a* connects to and is illustratively integral with second segment 258*b***.

Second segment **258*b* extends from first segment 258*a* towards the foot end 34 as shown in FIG. 9. In the illustrative embodiment, second segment 258*b* of first sub-rail 258 is straight and extends from first segment 258*a* parallel to its corresponding torso rail 254. Second segment 258*b* illustratively connects to second sub-rail 262**.

As illustratively suggested in FIG. 8, the angle β of each first segment **258*a* is about 30 degrees. In some embodiments, first segment 258*a* of first sub-rail 258 of support rails 218, 220 may have any angle relative to its corresponding torso rail 254** including but not limited to any angle within the range 0-40 degrees.

Second sub-rails 262 are arranged in parallel spaced apart relation to each other as suggested in FIGS. 8 and 9. In the illustrative embodiment, second sub-rails 262 connect to their respective first sub-rails 256 and extend perpendicularly therefrom as shown in FIGS. 8 and 9. Second sub-rails 262 each connect to opposite lateral ends of second beam 224.

Actuator assembly 216 includes actuators 268 as shown in FIG. 8. Each actuator 268 has first end **268*a* pivotably coupled to frame 212 and second end 268*b* pivotably coupled to support platform 214 as shown in FIGS. 8 and 9. Illustratively, first end 268*a* of one of the actuators 268 is coupled to leg rail 256 of one of the support rails 218, 220, and first end 268*a* of the other actuator 268 is illustratively coupled to leg rail 256 of the other support rail 218, 220. Ends 268*a* of each actuator 268 are illustratively connected to frame 212 by brackets 269. Illustratively, second end 268*b* of one of the actuators 268 is coupled to a bottom side of the leg platform 238, and second end 268*b* of the other actuator 268 is illustratively coupled to the bottom side of the leg platform 238 in spaced apart relation to the second end 268*b* of the one actuator 268**.

Figure 10:
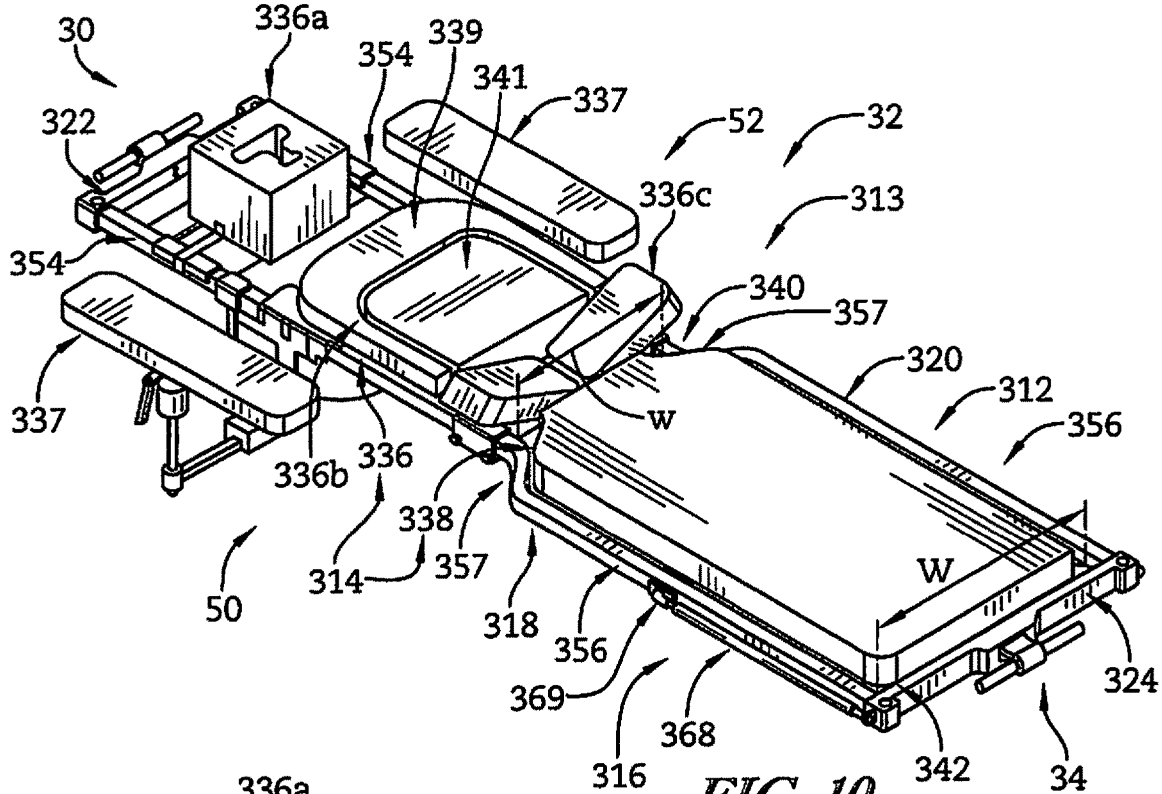
FIG. 10 is a top perspective view of a patient support of another illustrative embodiment of the surgical support having a leg platform in a raised position.
Figure 11:
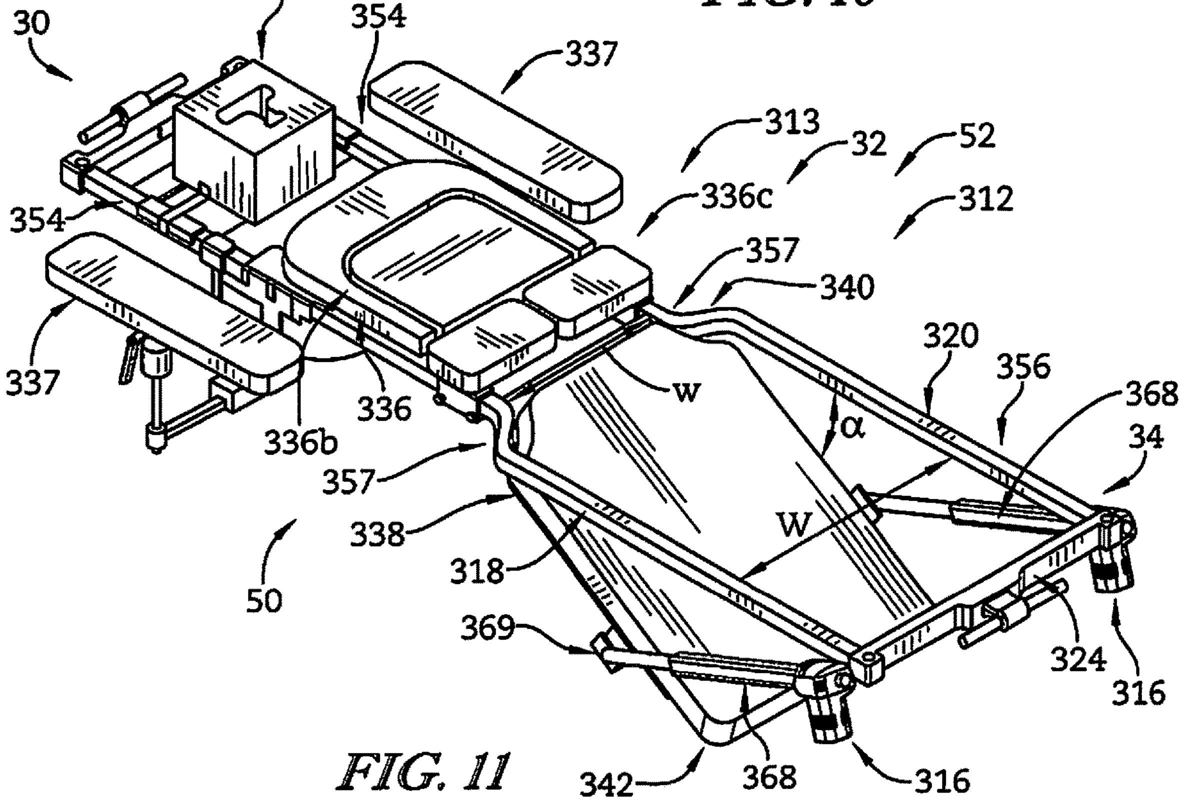
FIG. 11 is a top perspective view of the patient support as shown in FIG. 10 showing the leg platform in a lowered position.

Leg platform 238 is illustratively includes tapered sections 253 located at the footward end 242 as shown in FIGS. 10 and 11. Tapered sections 253 are illustratively defined by chamfers of the leg platform 238. Each tapered section 253 includes a channel 255 defined in a bottom surface of leg platform 238. Channels 255 are configured to accommodate actuators 268 therein when the leg platform 238 is in the lowered position as shown in FIG. 11.

Referring now to a third illustrative embodiment shown in FIGS. 10 and 11, a patient support 313 includes frame 312, a platform 314, and an actuator assembly 316. Patient support 313 is configured for use in surgical support 10 and is similar in many respects to the patient supports 13, 213 shown in FIGS. 1-9B and described herein. Accordingly, similar reference numbers in the 300 series indicate features that are common between patient support 313 and any of patient supports 13, 213 unless indicated otherwise. The description of patient supports 13, 213 is equally applicable to patient support 313 except in instances when it conflicts with the specific description and drawings of patient support 313.

Frame 312 includes support rails 318, 320 and first and second beams 322, 324. Support rails 318, 320 extend in spaced apart relation to each other between beams 322, 324 from the head end 30 to the foot end 34 of the patient support 310.

Support rail 318 illustratively connects with beam 322 on the left lateral side 50 (as depicted in FIG. 10) of patient support 313 and extends footward to connect with beam 324 on the same left lateral side 50 as shown in FIG. 10. Support rail 320 illustratively connects with beam 322 on the right lateral side 52 (as depicted in FIG. 10) of patient support 313 and extends footward to connect with beam 324 on the same right lateral side 52 as shown in FIG. 10.

Support rails 318, 320 each include a torso rail 354 and a leg rail 356 as shown in FIGS. 10 and 11. Each torso rail 354 extends from the head end 30 to the mid-section 32 of the patient support 313. Torso rails 354 are each illustratively embodied as straight rails extending in parallel spaced apart relation to each other. Torso rails 354 are illustratively connected to beam 322 at opposite lateral ends thereof as shown in FIG. 10. Torso rails 354 on each lateral side 50, 52 connect to one leg rail 356 on the corresponding lateral side 50, 52 at the mid-section 32 of the patient support 313.

Each leg rail 356 extends from the mid-section 32 to the foot end 34 of patient support 13 as shown in FIGS. 10 and 11. Each leg rail 356 illustratively connects to one corresponding torso rail 354 at the mid-section 32 of patient support 313. At the mid-section 32, the leg rails 356 are in spaced apart relation to each other defining a first distance w illustratively equal to a distance between rails 354. Each leg rail 356 is formed to include a jog 357.

Each jog 357 is a bent section of its leg rail 356 as shown in FIGS. 10 and 11. Each jog 357 illustratively includes a section of one leg rail 356 which is bent outwardly in a direction away from the other leg rail 356 such that the leg rails 356 are in spaced apart relation to each other defining a second distance W greater than the first distance w defined between rails 354. In the illustrative embodiment, jog 357 of each leg rail 356 extends outwardly away from the other leg rail 356 by an equal amount. Leg rails 356 along their entire length are illustratively coplanar with the torso rails 354. Jogs 357 are illustratively embodied as integral sections of rails 318, 320 that are curved as a part of formation, but in some embodiments may include distinct rail portions joined by any suitable joining manner, for example, fastening and/or welding.

Support platform 314 illustratively includes a torso platform 336 and a leg platform 338 as shown in FIG. 10. Leg platform 338 is hingedly supported by frame 312 to pivot such that a footward end 342 of leg platform 338 is lowered relative to its headward end 340 to provide leg break to an occupying patient as shown in FIGS. 10 and 11. Leg platform 338 is arranged between leg rails 356 and is configured for movement between the leg rails 356. Actuator assembly 316 assists in driving the leg platform 338 for pivoting movement between a raised position (shown in FIG. 10) and a lowered position (shown in FIG. 11). In the illustrative embodiment as shown in FIGS. 10 and 11, headward end 340 is hingedly connected to frame 12, but footward end 342 of leg platform 338 is a free end having no direct connection with any support structure, for example, footward end 342 illustratively has no direct structural connection to frame 312, bracket 17, and/or tower 21.

In the illustrative embodiment shown in FIG. 10, actuator assembly 316 includes gas spring actuators 368 configured to assist manual operation of leg platform 338 between raised and lowered positions. Bracket 329 connected to the underside of leg platform 338 and has a U-shaped portion in which the leg rails 356 rest when leg platform 338 is in the raised position as shown in FIG. 10. In the illustrative embodiment, an end of one actuator 368 is pivotably attached to an outer lateral end of beam 324, and another end of the same actuator 368 is pivotably attached to an actuator bracket 369. An end of the other actuator 368 is pivotably attached to another outer lateral end of beam 324, and another end of the same actuator 368 is pivotably attached to an actuator bracket 369. Actuator brackets 369 are illustratively connected to leg platform 338 at opposite lateral sides 50, 52 to provide pivotable operation assistance thereto. In some embodiments, such as the embodiment as shown in FIG. 11, actuators 368 are configured for full powered actuation independent of manual operation, for example, configuration to drive the full load of leg platform 338 and an occupying patient and/or including connection to a control system for activation of the actuators 368. In some embodiments, actuators 368 may be omitted in favor of a fully manual operation of leg platform 338.

Regardless of whether actuators are gas springs or powered linear actuators, the positing of leg platform 228 in the raised and lowered positions is generally as depicted in FIGS. 10 and 11. The gas springs contemplated are locking gas springs that are released via actuation of a release handle as is well known in the art. Such a release handle may be located in the vicinity of the bracket 369, for example. Actuation of the release handle adjacent either bracket 369 releases both gas springs via suitable cabling and/or linkages. In the case of linear actuators, an electrical cable from actuators 368 plugs into a port of base 11 so that an electrical control panel of base 11 is used to control operation of the actuators 368.

Torso platform 336 comprises head platform **336*a*, a chest platform 336*b*, a hip platform 336*c*, and arm platforms 337 as shown in FIGS. 10 and 11. In the illustrative embodiment, each of head platform 336*a*, chest platform 336*b*, hip platform 336*c*, and arm platforms 337 comprise body-part specific supports and padding that are independently attached to the frame 312 and configured to provide a comfortable interface to the specific parts of the patient's body in a variety of positions. In the illustrative embodiment shown in FIGS. 10 and 11, hip platform 336*c* illustratively includes two hip pads that are selectively configurable in either of a flat position (FIG. 11) to accommodate supine and/or lateral positioning, or an angled position (FIG. 10**) to accommodate prone positioning.

Chest platform **336*b* includes breast platform 339 and abdomen platform 341 as shown in FIG. 10. In the illustrative embodiment, breast platform 339 has a U-shape. Breast platform 339 is configured to support a patient's upper chest, but not her abdomen while the patient is in the prone position. Breast platform 339 illustratively surrounds abdomen platform 341** on three sides thereof.

Abdomen platform 341 is arranged between chest platform 339 and hip platform **336*c* as shown in FIG. 10. As shown in FIG. 10, abdomen platform 341 is arranged in a raised position generally coplanar with chest platform 339 to support the patient's middle body in certain positions, for example, the lateral and supine positions. As described herein with respect to abdomen pad 1300 shown in FIG. 15, abdomen platform 341 is configurable into a lowered position to allow the abdomen of a patient in the prone position to hang downwardly and/or sag relative to the torso platform 336 of patient support 313**. Allowing the patient's abdomen to sag can provide particular spine arrangement while the patient is lying in the prone position.

Figure 12:
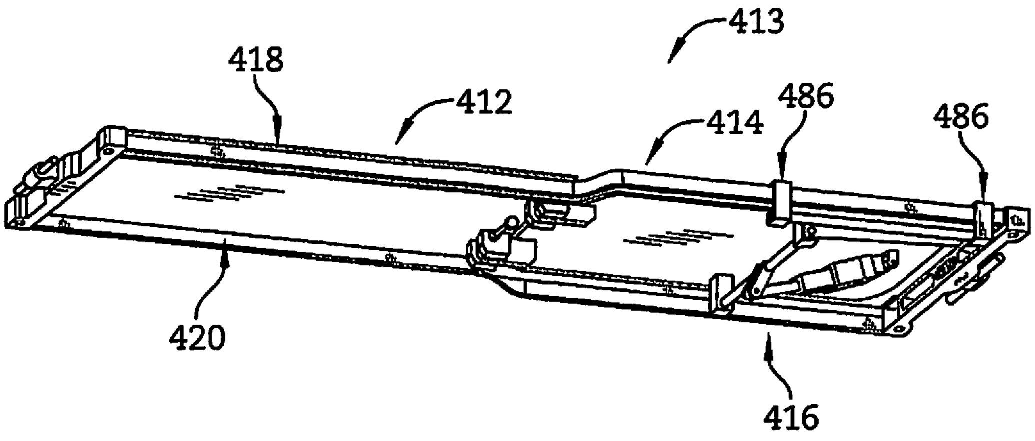
FIG. 12 is a bottom perspective view of a patient support of another illustrative embodiment of the surgical support having a leg platform in a raised position.
Figure 13:
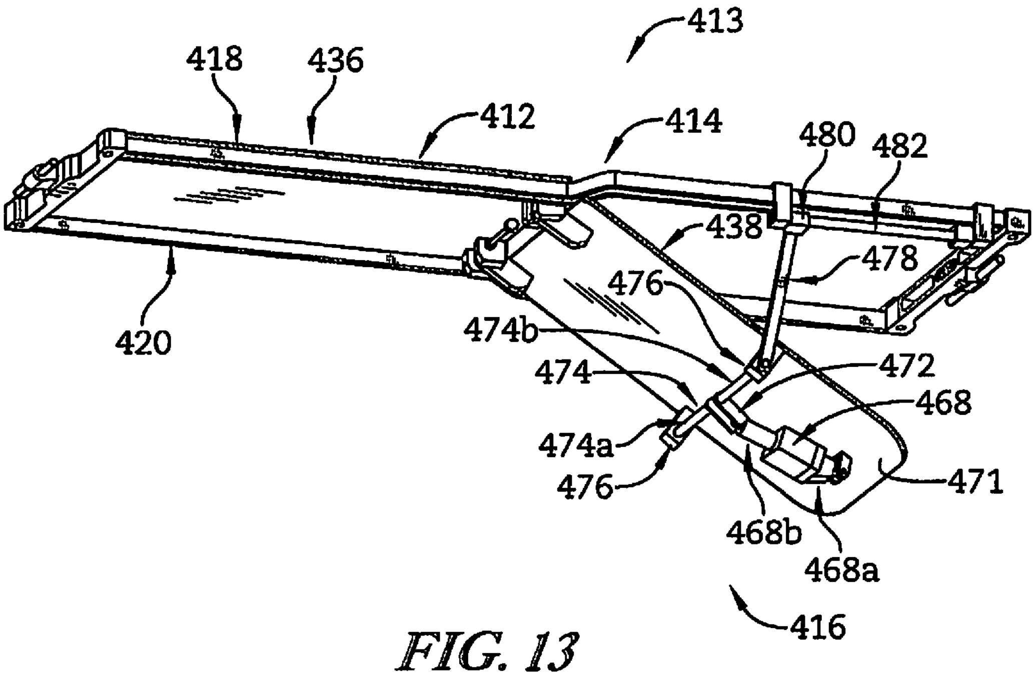
FIG. 13 is a bottom perspective view of the patient support shown in FIG. 12 showing the leg platform in the lowered position.

Referring now to a fourth illustrative embodiment shown in FIGS. 12 and 13, a patient support 413 includes a frame 412, a platform 414, and an actuator assembly 416. Patient support 413 is configured for use in in surgical support 10 and is similar in many respects to patient supports 13, 213, 313 shown in FIGS. 1-11 and described herein. Accordingly, similar reference numbers in the 400 series indicate features that are common between patient support 413 and any of patient supports 13, 213, 313 unless indicated otherwise. The description of patient supports 13, 213, 313 is equally applicable to patient support 413 except in instances when it conflicts with the specific description and drawings of patient support 413.

Actuator assembly 416 is configured to operate to drive a leg platform 438 between raised (FIG. 12) and lowered (FIG. 13) positions. Actuator assembly 416 includes an actuator 468, a lever 472, an axle 474, a transmission bar 478, a slider 480, and a slider rail 484. Actuator 468 illustratively applies force to lever 472 to rotate axle 474 and transmission bar 478, such that slider 480 moves along slider rail 484 to move the leg platform 438 between raised and lowered positions as suggested in FIGS. 12 and 13.

Actuator 468 has an end **468*a* pivotably coupled to a bottom side 471 of leg platform 438 and another end 468*b* pivotably coupled to lever 472. In the illustrative embodiment, actuator 468 is a linear actuator configured to operate between extended (FIG. 12) and retracted positions (FIG. 13). Lever 472 is illustratively configured to rotate to transfer linear movement of actuator 468 to pivoting movement of axle 474 to drive leg platform 438** between raised and lowered positions.

Lever 472 is pivotably attached to end **468*b* of actuator 468 as shown in FIG. 13. Lever 472 is connected to and fixed against rotation with respect to axle 474. Axle 474 is rotatably supported by leg platform 438. Axle 474 includes first and second ends 474*a*, 474*b*. Each end 474*a*, 474*b* is illustratively supported for rotation at by a mount 476 that extends perpendicularly from bottom side 471 of leg platform 438. Axle 47 is illustratively fixed against rotation with respect to transmission bar 478**.

Transmission bar 478 is configured to transmit rotational force from axle 474 to frame 412 to drive the leg platform 438 between lowered and raised positions as shown in FIGS. 12 and 13. Transmission bar 478 is illustratively connected to end **474*b* of axle 474. Transmission bar extends from the axle 474 to pivotably connect with a slider 480. Slider 480 is configured to be mounted onto a slider rail 484 to drive leg platform 438** between raised and lowered positions.

Slider rail 484 is mounted to frame 412 as shown in FIGS. 12 and 13. Slider rail 484 is illustratively attached to support rail 418 below the support rail 418 and extends parallel thereto. Slider rail 484 including a headward end **484*a* and footward end 484*b* each connected to support rail 418 by rail mounts 486 such that slider rail 484 is in spaced apart relation to support rail 418. Movement of slider 480 along the slider rail 484 corresponds to the position of leg platform 438 between the raised and lowered positions. In some embodiments, two bars 479, sliders 480, and rails 482 are provided at opposite sides of patient support 413** and both operate as just described.

According to another aspect of the disclosure, a surgical support and method of operating the surgical support are shown in FIGS. 14A-14F. During a surgery, it may be desirable to place the patient in a first position, for example a lateral position, for a period of time and then to reposition the patient in a second position, for example a prone position. A surgical support 1000 is configured to accommodate both lateral and prone positions of the patient. Surgical support 1000 includes patient support 1013.

Surgical support 1000 is substantially similar to surgical support 10, and patient support 1013 is substantially similar to patient support 413 shown in FIGS. 12 and 13 and described herein. Accordingly, similar reference numbers in the 1000 series indicate features that are common between patient support 1013 and patient support 413 unless indicated otherwise. The description of patient supports 413 is equally applicable to patient support 1013 except in instances when it conflicts with the specific description and drawings of patient support 1013.

Figure 14A:
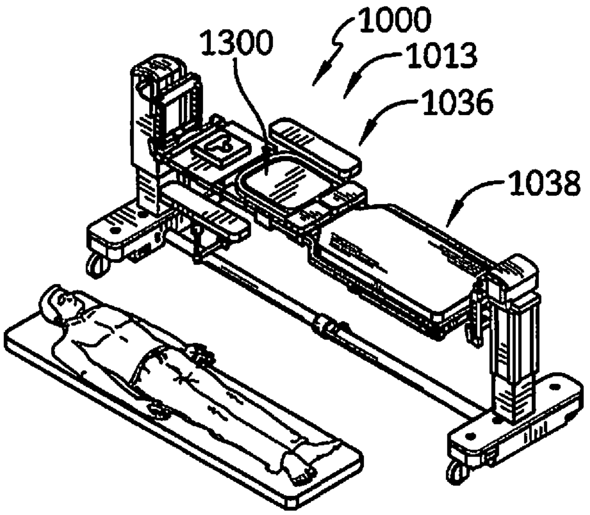
FIGS. 14A-14F are pictorial flow sequence depictions of a support and a method of operating the surgical support for positioning a patient.

A patient is positioned in proximity to surgical support 1000 on a support surface of a transport device such as a stretcher as shown in FIG. 14A. The patient is typically transported while lying in the supine position. The patient is transferred to surgical support 1000 in the supine position as shown in FIG. 14B.

Figure 14D:
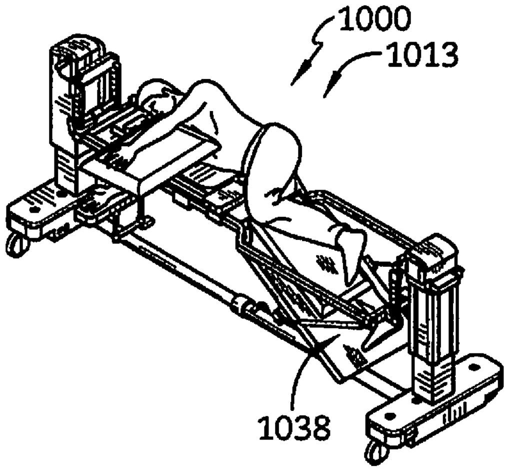
Figure 14B:
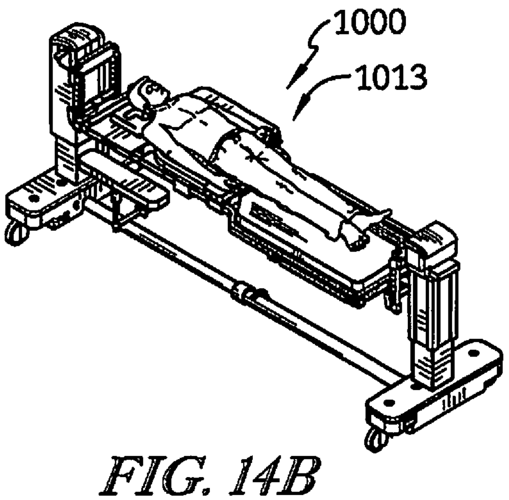
Figure 14E:
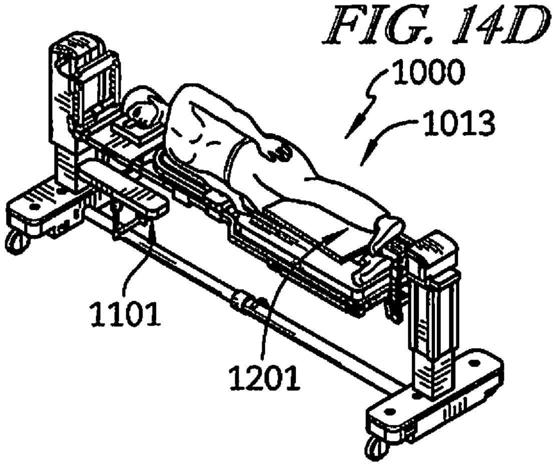
Figure 14C:
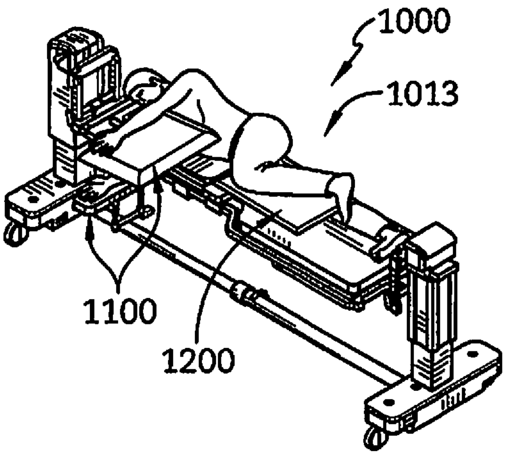

During a surgical procedure, the surgical team moves the patient's body into the lateral position as shown in FIG. 14C. This involves rotating the patient by about 90 degrees onto the patient's side without rotating the patient support 1000 relative to base 11. In the illustrative embodiment, the lateral position affords access to certain surgical sites on the patient's body, for example the spine. In the illustrative embodiment as shown in FIG. 14C, various limb supports 1100 are selectively attached to frame 1012 and/or positioning devices 1200 are placed in contact with the patient to finely adjust the patient's body for surgical access. Positioning device 1200 is illustratively embodied as a surgical pillow but may include any of clamps, straps, cushions, bladders, and/or supports.

Surgical support 1000 is operated to lower leg platform 1038 relative to torso platform 1036 to provide leg break to the patient as shown in FIG. 14D. Leg portion 1038 is operated to achieve a desired position between the raised and lowered positions to produce the desired amount of leg break, illustratively the lowered position as shown in FIG. 14D. Leg break provides access to certain surgical sites during certain portions of surgical procedures, for example, to spinal areas during a lateral spinal fusion, more specifically a lateral lumbar interbody fusion.

Surgical support 1000 is operated to remove leg break from the patient as shown in FIG. 14E. Leg portion 1038 is operated to achieve the raised position. Limb supports 1100 and positioning devices 1200 are illustratively removed and replaced with limb supports 1101 and positioning devices 1201 for supporting the patient while lying in the prone position.

Figure 14F:
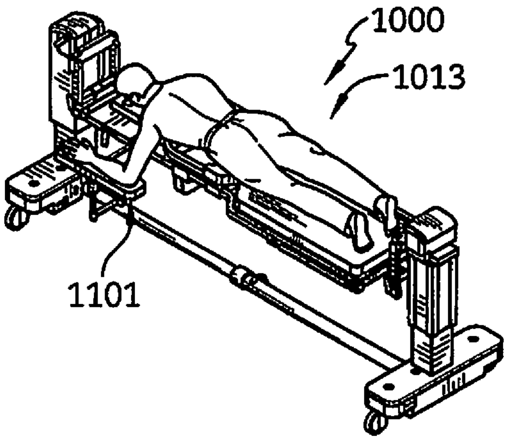

The surgical team moves the patient's body into the prone position as shown in FIG. 14F. This illustratively involves rotating the patient by about 90 degrees onto the patient's front without rotating the patient support 1000 relative to base 11. The prone position provides access to certain surgical sites to permit certain surgical procedures, for example, posterior spinal fusion.

Figure 15:
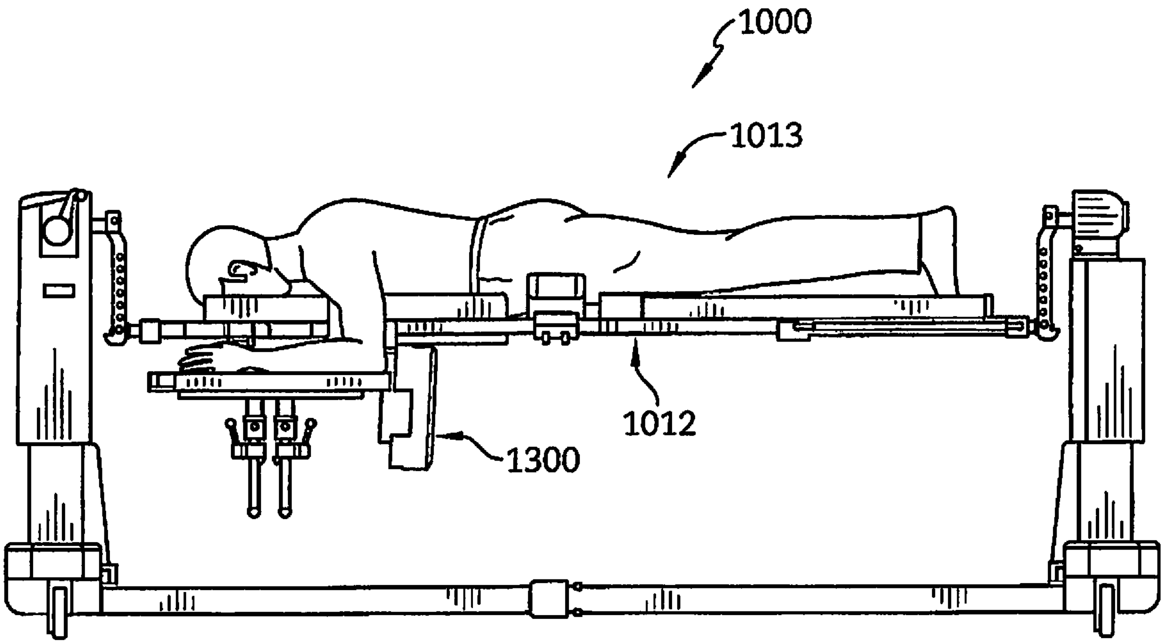
FIG. 15 is an elevation view of the pictorial flow sequence portion depicted in FIG. 14F showing the surgical support configured for accommodating a patient in a prone position and showing that an abdomen pad has been removed

An abdomen platform 1300 is illustratively pivoted downwardly away from the patient's body to accommodate the patient's body in the prone position as shown in FIG. 15. The abdomen platform 1300 is configured to attach to a frame 1012 to be selectively positioned between a raised position suggested in FIGS. 14A-14F to support the patient, and a lowered position as shown in FIG. 15 to permit the patient's abdomen to hang downwardly relative to torso platform 1036. Lowering of the abdomen platform 1300 can enhance the positioning of the spine the patient's spine in position for surgery.

The surgical support 1000 accommodates various patient body positions including lateral position with leg break and prone position. The surgical support 1000 thus provides access to surgical sites of the patient's body in various body positions without the need to rotate surgical support 1000 relative to base 11.

The present disclosure includes, among other things, the notion that during spinal surgery, the surgeon often needs to "break" the patient's legs. This means they are bent down below the horizontal plane of their torso in order to open the lateral disk space in their spine. Various supports are disclosed herein that can allow a surgeon to drop the patient's legs. This can be accomplished through one or more of a passive/manual joint, electric actuator(s), and/or pneumatic actuator(s). The leg drop section allows a surgeon to position the patient's legs in a range of angular positions, such as from 0 to 30 degrees.

Clinically, this allows a surgeon to increase the vertebral spacing of the lumbar spine to gain access to the necessary disk space. This can be done before and/or during surgery. The device can have a major structural frame spanning two columns of the table. Within this frame, there is a secondary rotatable structure that allows the patient's legs to drop in between the structural frame or relative to the structural frame, depending upon the embodiment. In one aspect, the angle is manually adjusted and then locked at the desired position. In another aspect, a spring force, such as that provided by gas springs is applied to aid in supporting the patient's legs. In another aspect, an electric or pneumatic actuator drives the leg platform or section to the desired position. A leg drop section allows the surgeon to use the same table for lateral and prone surgeries. As the lateral surgery is often followed up immediately on the same patient with a prone surgery, this eliminates the need of transferring the patient to a separate table or rotating the patient to a different table top structure that attached to base 11. The disclosed devices have additional clearance for imaging equipment (such as a C Arm) and is desirable for spinal surgeries.

The present disclosure includes, among other things, a discussion of supports that allows a surgeon to complete a lateral lumbar interbody fusion with posterior fusion on one support frame. Such devices may allow a patient to be transferred from a stretcher onto the device in supine position, the patient to be rotated into a lateral position using a drawsheet, and/or the patient to be rotated into a prone position using a drawsheet. Patient support pads of the device can be adjustable and/or adaptable to all three positions eliminating the needs to transfer the patient onto an additional device during the procedure. The device may include dual parallel carbon fiber rails that can accommodate various pad attachments.

The support pads may lay flat to accommodate a supine and lateral patient. When the patient is in the prone position, the hip pads can be adjusted so that they are angled to properly support the patient's hips and the pad underneath the patient abdomen may drop away so that the abdomen can hang free. The leg support sections disclosed herein are hinged near the hip of the patient so that the legs can be dropped below horizontal in the lateral position as well as in the prone position. The disclosed devices may eliminate the need to transfer the patient to an additional device during lateral to prone procedure, eliminate the need to log-roll a patient from the stretcher into the prone position 180 degrees, clear access to surgical sites by eliminating vertical supports, provide a support top that does not need to rotate because the patient is rotating on top of the support platform, provide that the patients legs can be dropped in lateral as well as prone positions because of the breaking support platform.

The present disclosure includes, among other things, a discussion of rigid lateral patient support frames that can flex the patient at the hip by a hinged support section. Utilizing a linkage and actuator, the patient's legs can be safely raised and lowered with a single low powered actuator, reducing complexity and other aspects of a two actuator design. The device may consist of a carbon fiber frame lateral leg support section that is mounted to by hinge to a main support frame. A linear actuator can be mounted to an underside of the leg drop section on one end and then connected to a moment arm on the other end. The moment arm may be directly connected to a rotary shaft. Attached to each end of the rotary shaft may be another linkage that transmits the power of the actuator to a linear rail. As the actuator pushes or pulls, the linkage can be forced to slide along the rail which raises and lowers the leg section. Such an arrangement may allow for a patient to be flexed in a lateral position, for the support top to be cheap, light, and easy to connect to the existing product bases, and/or for a single actuator to be used in lieu of two actuators.

According to another aspect of the present disclosure, a surgical support 2000 and method of operating the surgical support 2000 are shown in FIGS. 16-20. During a surgery, it may be desirable to place the patient in a first position, for example a lateral position, for a period of time and then to reposition the patient in a second position, for example a prone position. Surgical support 2000 is configured to accommodate both lateral and prone positions of the patient. Surgical support 2000 includes a first patient support 2012 configured to support the patient in the supine and lateral positions during surgery and a second patient support 2013 configured to support the patient in the prone position during surgery. Supports 2012, 2013 are oriented at about 90° with respect to each other. Thus, supports 2012, 2013 are rotated during surgery so that one or the other of supports 2023, 2013 underlies and supports the patient.

Surgical support 2000 is substantially similar to surgical support 10 as described above. Accordingly, the description and illustrations of surgical support 10 is equally applicable to surgical support 2000 except in instances of conflict with the specific description and drawings of surgical support 2000.

Figure 16:
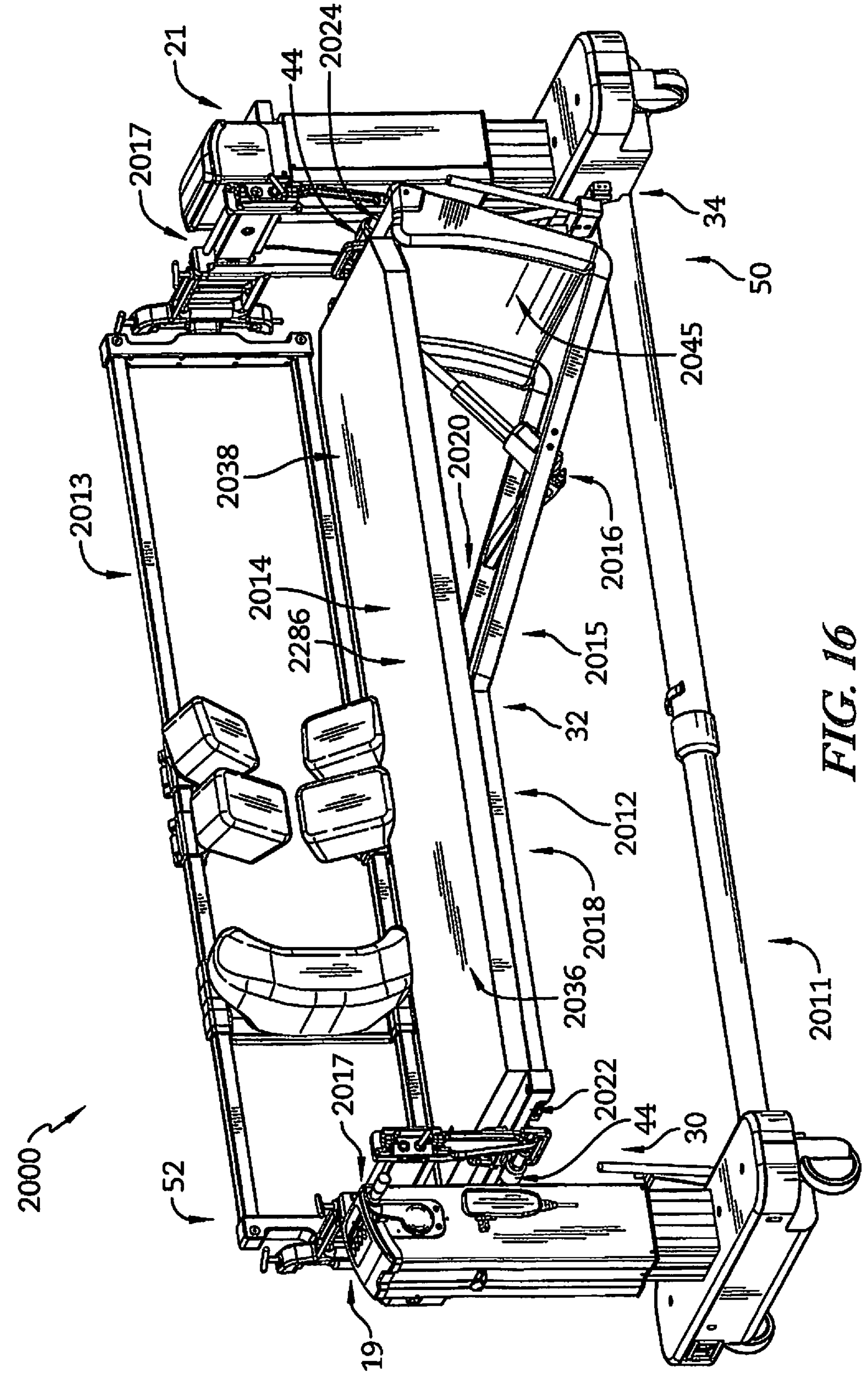
FIG. 16 is a perspective view of another surgical support that includes a patient support having a support frame supporting a platform that has a torso platform and a leg platform, the leg platform being pivotable between a raised position that is parallel with the torso platform and a lowered position that is inclined with respect to the torso platform, and showing that the surgical support includes a protection sheath coupled to the frame at the foot end of the surgical support to block against pinch points during movement of the leg platform between the raised and lowered positions.

Surgical support 2000 includes a base 2011 as shown in FIG. 16. Base 2011 supports patient supports 2012, 2013 above the floor to provide support to the surgical patient. Patient support 2012 includes a frame 2015, a support platform 2014 having support padding 2286 disposed thereon, and an actuator assembly 2016. The support platform 2014 is operable to provide leg break to a patient occupying the surgical support 2000 while lying in the lateral position.

Figure 17:
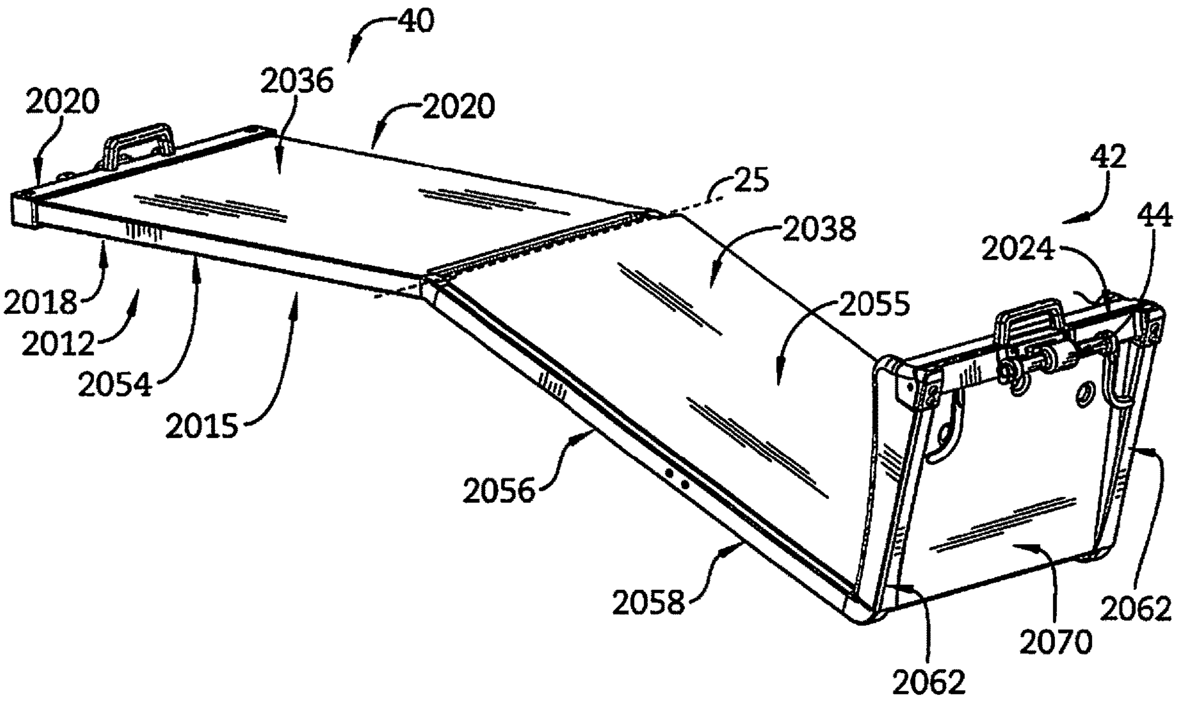
FIG. 17 is a perspective view of the patient support of the surgical support of FIG. 16 showing the leg platform in the lowered position and the protection sheath receiving upwardly extending rails of the support frame therein to couple the protection sheath with the frame and showing a horizontal beam of the frame received within the protection sheath.
Figure 18:
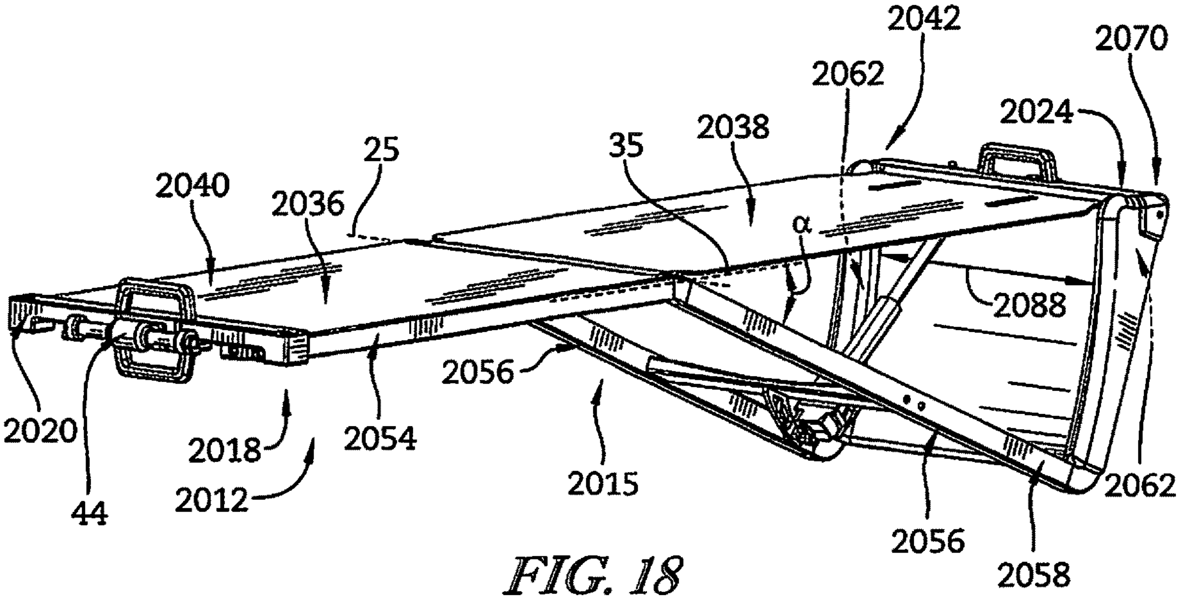
FIG. 18 is a perspective view of the patient support of FIG. 17 showing the leg platform in the raised position and the protective sheath including a tray and arms disposed on lateral sides of the tray, and showing the protective sheath having a shape that corresponds closely to the travel path of a foot end of the leg platform to block pinch points.

As shown in FIG. 16, frame 2015 supports the support platform 2014 that, in turn, supports the patient, generally with padding disposed between the patient and the support platform 2014 for comfort. Each of the patient supports 2012, 2013 includes a head end 30, a mid-section 32, a foot end 34, and right and left lateral sides 50, 52. Patient support 2012 is configured for leg break action of the support platform 2014 that includes movement of a leg platform 2038 between a raised position in which leg platform 2038 is generally parallel with a torso platform 2036 of support 2012 (as shown in FIG. 18) and a lowered position in which the leg platform 2038 is pivoted out of parallel to an inclined position with respect to the torso platform 2036 (as shown in FIG. 17) to provide leg break to the patient occupying the surgical support 2000. Patient support 2012 illustratively includes a protection sheath 2070 coupled to the frame 2015 proximate to the foot end 34 to provide pinch protection while operating the leg platform 2038 for movement.

Base 2011 includes elevator towers 19, 21 as shown in FIG. 16. Elevator towers 19, 21 each carry a support bracket 2017 to provide support to the patient support 2012 for vertical raising, lowering, and tilting when one or both of the towers 19, 21 are operated to extend or retract. One portion of support bracket 2017 of elevator tower 19 is connected to frame 2015 of patient support 2012 at the head end 30, and one portion of bracket 2017 of elevator tower 21 is connected to frame 2015 of the patient support 2012 at the foot end 34. Another portion of support bracket 2017 of elevator tower 19 is connected to patient support 2013 at the head end 30, and another portion of bracket 2017 of elevator tower 21 is connected to the patient support 2013 at the foot end 34.

Frame 2015 includes support rails 2018, 2020 and first and second beams 2022, 2024 as shown in FIG. 16. Rails 2018, 2020 extend generally in the longitudinal dimension of surgical support 2000 and beams 2022, 2024 extend generally horizontally in the lateral dimension of surgical support 2000 when patient support 2012 is supported in orientation shown in FIGS. 16-18. Frame 2015 is illustratively comprised of tubular members, but in some embodiments may include any one or more of solid, truss, and/or any combination of frame members. In some embodiments, rails 2018, 2020 and beams 2022, 2024 are made primarily of radiolucent materials such as carbon fiber materials. First beam 2022 is illustratively arranged at the head end 30 and second beam 2024 is arranged at the foot end 34 of the patient support 2012. Support rails 2018, 2020 extend parallel to each other between beams 2022, 2024 from the head end 30 to the foot end 34 of the patient support 2012.

Support rail 2018 illustratively connects with beam 2022 on the right lateral side 50 (as depicted in FIG. 16) of patient support 2013 and extends footwardly to connect with beam 2024 on the same lateral side 50 as shown in FIG. 16. Support rail 2020 illustratively connects with beam 2022 on the left lateral side 52 (as depicted in FIG. 16) of patient support 2013 and extends footwardly to connect with beam 2024 on the same lateral side 52 as shown in FIG. 16. Frame 2015 is configured to support the support platform 2014 as noted above.

As shown in the illustrative embodiment of FIGS. 16-18, support rails 2018, 2020 of the frame 2015 are disposed at respective right and left lateral sides 50, 52 of patient support 2013 in spaced apart relation to each other. Each support rail 2018, 2020 illustratively includes a torso rail 2054 and a leg rail 2056. Each torso rail 2054 illustratively extends from the head end 30 to the mid-section 32 of the surgical support 2012. The torso rails 2054 are each illustratively embodied as straight rails extending in parallel spaced apart relation to each other. The torso rails 2054 are illustratively connected to opposite lateral ends of beam 2022 as shown in FIG. 16. Torso rails 2054 on each lateral side 50, 52 illustratively connect to one leg rail 2056 on the corresponding lateral side 50, 52 at the mid-section 32 of patient support 2013. In the illustrative embodiment, torso rails 2054 are connected to their respective leg rails 2056 by rigid connections such that rails 2054, 2056 do not move relative to each other.

Each leg rail 2056 illustratively extends from the mid-section 32 to the foot end 34 of patient support 2013 as shown in FIGS. 17 and 18. Each leg rail 2056 illustratively connects to one corresponding torso rail 2056 at the mid-section 32 of patient support 2013. Each leg rail 2056 illustratively includes a first sub-rail 2058 and a second sub-rail 2062 as shown in FIGS. 17 and 18. In the illustrative embodiment shown in FIG. 18, first sub-rail 2058 of first rail 18 extends from mid-section 32 toward foot end 34 at angle $\alpha$ relative to its corresponding torso rail 2054 of the same first support rail 2018 (the position of the torso rail 2054 indicated by dotted line 35 in FIG. 18). In the illustrative embodiment, the first sub-rail 2058 is straight and extends at angle $\alpha$ of about 35 degrees relative to its corresponding torso rail 2054 of first support rail 2018.

As illustratively suggested in FIGS. 17 and 18, the angle $\alpha$ of each first sub-rail 2058 is downward relative to their respective torso rails 2054, however, the indication of the relative direction downward is descriptive and is not intended to limit the orientation of the frame 2015 of the surgical support 2000. In some embodiments, the first sub-rail 2058 of each first and second support rails 2018, 2020 may have any angle $\alpha$ relative to its corresponding torso rail 2054 including but not limited to any angle within the range of about −15 to about 90 degrees, for example.

As shown in FIG. 17, support platform 2014 illustratively includes the torso platform 2036 and the leg platform 2038. Torso platform 2036 extends from head end 30 to mid-section 32 of patient support 2013. Leg platform 2038 extends from the mid-section 32 to a foot end 2042 near the foot end 34 of the patient support 2013.

Leg platform 2038 is hingedly supported by frame 2015 to pivot about an axis 25 extending laterally relative to patient support 2012 such that a foot end 2042 of leg platform 2038 is lowered relative to its head end 2040 to provide leg break to an occupying patient as shown in FIG. 17. In the illustrative embodiment shown in FIGS. 16-18, leg platform 2038 is supported by the actuator assembly 2016 so as to be cantilevered with respect to the hinged connection to torso platform 2036. Head end 2040 is hingedly connected to frame 2015 in some embodiments, but regardless of whether head end 2040 is hingedly connected to torso platform 2036 or frame 2015, foot end 2042 of leg platform 2038 is a free end having no direct connection with any support structure, for example, foot end 2042 illustratively has no direct structural connection to frame 2015, bracket 2017, and/or tower 21.

In the illustrative embodiment shown in FIGS. 17 and 18, the protection sheath 2070 is illustratively disposed near the foot end 34 of the surgical support 2000 to provide pinch protection during movement of the leg platform 2038. Protection sheath 2070 is illustratively coupled to each of the second sub-rails 2062 of each leg rail 2056 of each of the first and second support rails 2018, 2020. In the illustrative embodiment, the protection sheath 2070 extends across the space defined between the second sub-rails 2062 of each of the first and second support rails 2018, 2020.

Figure 19:
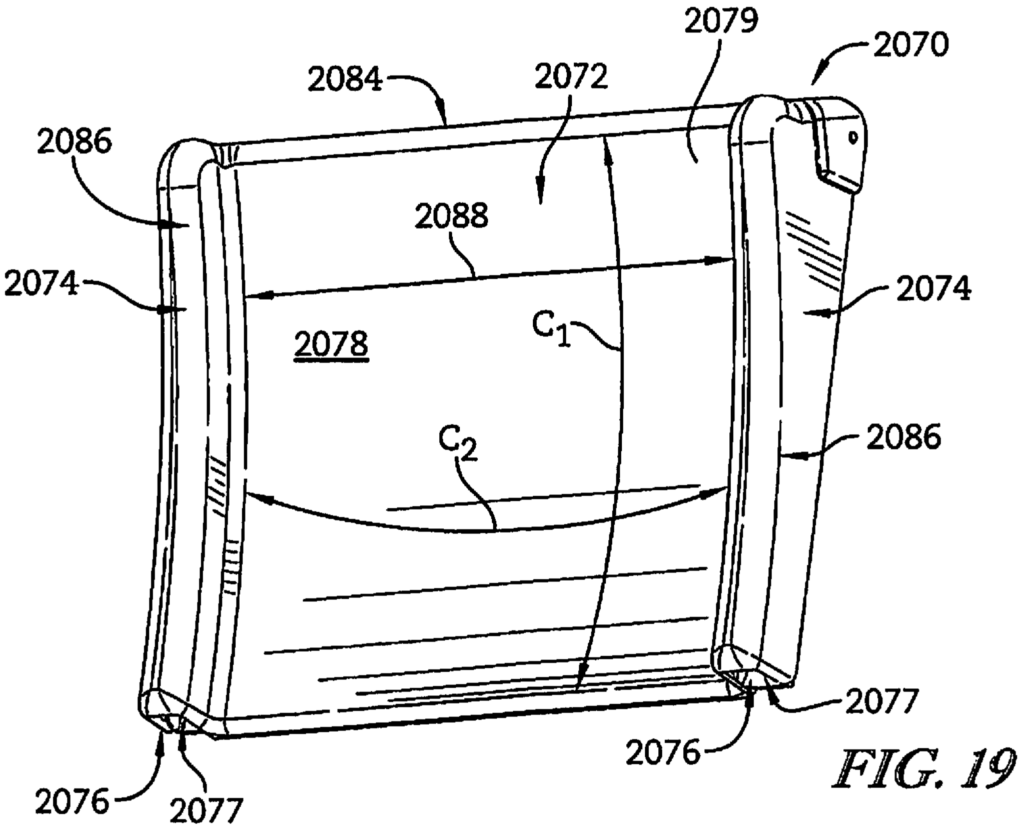
FIG. 19 is a perspective front view of the protection sheath of FIGS. 16-18 showing the protection sheath having a curvature along a horizontal direction that corresponds closely to the shape of the foot end of the leg platform and showing the arms of the protection sheath defining cavities therein for receiving the rails of the frame.
Figure 20:
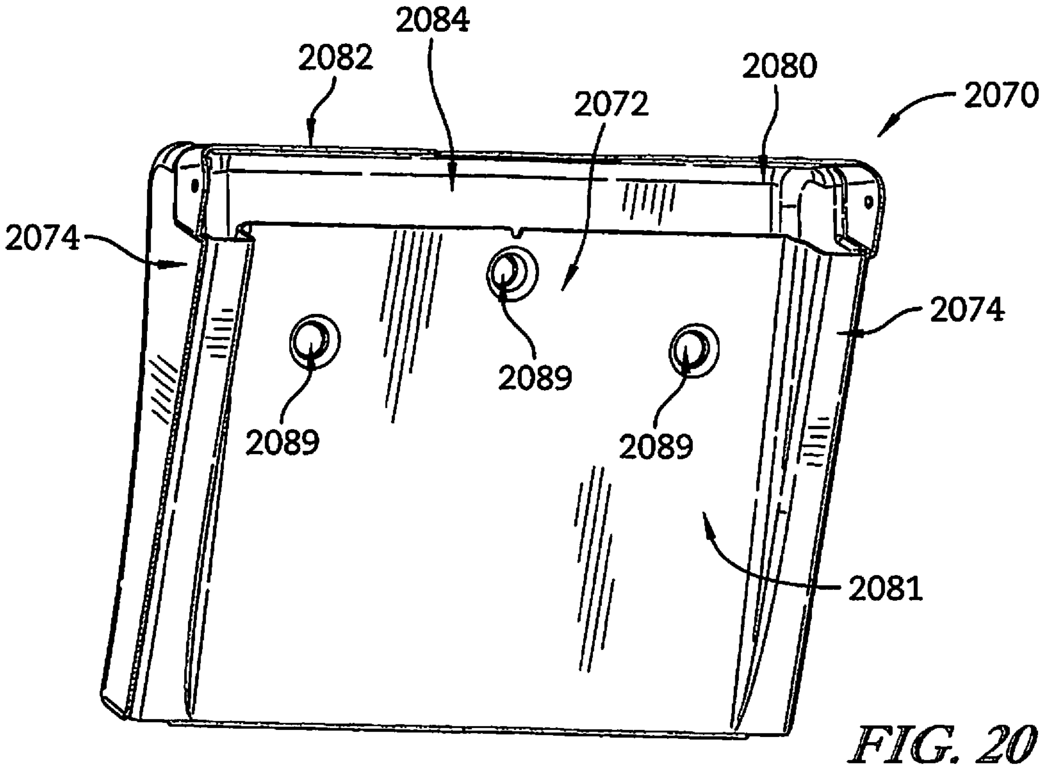
FIG. 20 is a perspective rear view of the protective sheath of FIG. 19 showing the protective sheath including a cavity extending between the arms for receiving the beam of the frame and showing that the cavity for receiving the beam is in communication with the cavities of the arms that receive the rails.

In the illustrative embodiment shown in FIGS. 19 and 20, the protection sheath 2070 is embodied as a shovel-shaped guard including a tray 2072 extending between and connecting to a pair of arms 2074. Tray 2072 illustratively includes a front side 2079 having a guide surface 2078 disposed thereon and having a shape that corresponds closely to the shape and the travel path of the leg platform 2038 to prevent pinch points during movement of the leg platform 2038. In the illustrative embodiment, the guide surface 2078 includes a curvature $C_1$ along the vertical direction (in the orientation shown in FIG. 19) corresponding closely to the travel path of the leg platform 2058 and a curvature $C_2$ along horizontal direction (in the orientation shown in FIG. 19) corresponding closely to the shape of the foot end 2042 of the leg platform 2038. By reducing spacing between the frame 2015 and the leg platform 2038 using the protection sheath 2070, the potential for a portion of a patient's, surgeon's or other person's body to be pinched between parts of the surgical support 2000 is reduced.

As best shown in FIG. 19, each of the arms 2074 defines an opening 2076 and a cavity 2077 extending from the opening 2076 for receiving one of the second sub-rails 2062 for connection between the protection sheath 2070 and the frame 2015. Arms 2074 each have a tapered width extending between a thicker width proximate to a top edge 2082 and a thinner width proximate to the opening 2076. Each arm 2074 illustratively includes a rounded front edge 2086 for comfortable contact with a patient supported by the surgical support 2000. In the illustrative embodiment, the arms 2074 are arranged in spaced apart relation to each other to define a gap 2088 therebetween for receiving passage of foot end 2042 of the leg platform 2038 in close proximity to the arms 2074 and the tray 2072 during movement of the leg platform 2038 to reduce pinch points.

As shown in FIG. 20, the protection sheath 2070 illustratively includes an opening 2080 formed on a rear side 2081 thereof near a top edge 2082 of the sheath 2070 and a cavity 2084 extending from the opening 2080 into the sheath 2070 for receiving the beam 2024. The opening 2080 extends between each of the arms 2074 along the top edge 2082 and the cavity 2084 is configured to receive the beam 2024 arranged proximate to the foot end 34 of the frame 2015 for connection with the support bracket 2017 through the opening 2080 via a floating arm 44 as shown in FIG. 16. In the illustrative embodiment, each of the cavities 2077 of the arms 2074 communicate with the cavity 2084 of the rear side 2081 of the protection sheath 2070 to from a continuous pathway such that the frame 2015 near the foot end 34, including the second sub-rails 2062 while connected to the beam 2024, is received within the sheath 2070 to reduce pinch points during movement of the leg platform 2038.

In the illustrative embodiment, the protection sheath 2070 is embodied as a hollow shell formed of plastic. In some embodiments, the protection sheath 2070 may be formed with any suitable interior structure and/or with any suitable materials. In the illustrative embodiment, divots or depressions 2089 are formed in rear side 2081 of sheath 2070 and extend toward tray 2072 so as to help rigidify tray 2072. That is, if tray 2072 flexes or attempts to flex toward rear side 2081, contact with depressions 2089 limits the amount of flexion that can occur.

Although certain illustrative embodiments have been described in detail above, variations and modifications exist within the scope and spirit of this disclosure as described and as defined in the following claims.

The invention claimed is:

1. A surgical patient support system, comprising:

a base frame including a head elevator tower and a foot elevator tower each having a support bracket connected thereto for movement of the support brackets between higher and lower positions as the head and foot elevator towers are raised and lowered, respectively, a support frame including first and second rails extending parallel to each other from a head end to a foot end, a head-cross beam and a foot-cross beam extending between the first and second rails at the head end and foot end respectively, and connection arms including a head-connection arm engaged with the head-cross beam and coupled with the support bracket of the head tower and a leg-connection arm engaged with the leg-cross beam and coupled with the support bracket of the leg tower, a support platform coupled to the support frame and including a torso section and a leg section, and an actuator coupled to the support frame and configured to support the leg section, wherein the actuator is operated electrically to move the leg section relative to the torso section between a raised position and a lowered position to create a leg break of a surgical patient in a lateral position, wherein the support frame comprises a first support frame and further comprising a second support frame coupled to the support brackets and arranged perpendicular to the support platform when the leg section is in the raised position.

2. The surgical patient support of claim 1, wherein the leg section of the support platform is hingedly attached to the support frame to move between the raised position and the lowered position and the actuator is pivotably connected to the leg section of the platform on a bottom side thereof.

3. The surgical patient support of claim 1, wherein the actuator is configured for operation between an extended position and a retracted position, the extended position of the actuator corresponds to the raised position of the leg section, and the retracted position of the actuator corresponds to the lowered position of the leg section.

4. The surgical patient support of claim 3, wherein the lowered position is arranged to contribute about 25° of leg break to the surgical patient in the lateral position.

5. The surgical patient support of claim 3, wherein the raised position is arranged to contribute about 0° of leg break to the surgical patient in the lateral position.

6. The surgical patient support of claim 3, wherein the actuator includes a linear actuator configured to rotate an axle.

7. The surgical patient support of claim 1, wherein the first and second rails each include a torso rail which extends from the head end towards the foot end and the first and second rails define a constant width between the torso rails along the extension direction.

8. The surgical patient support of claim 1, wherein the first and second rails each include a torso rail and a leg rail, the torso rails each extending from the head-cross beam towards the foot end to connect with the leg rail of the respective support rail, and each leg rail extends from connection with the torso rail of the respective support rail towards the foot end.

9. The surgical patient support of claim 1, wherein the torso section comprises a first flat panel and the leg section comprises a second flat panel.

10. A surgical patient support system, comprising:

a base frame including a head elevator tower and a foot elevator tower each having a support bracket connected thereto for movement of the support brackets between higher and lower positions as the head and foot elevator towers are raised and lowered, respectively, a support frame including first and second rails extending parallel to each other from a head end to a foot end, a head-cross beam and a foot-cross beam extending between the first and second rails at the head end and foot end respectively, and connection arms including a head-connection arm engaged with the head-cross beam and coupled with the support bracket of the head tower and a leg-connection arm engaged with the leg-cross beam and coupled with the support bracket of the leg tower, a support platform coupled to the support frame and including a torso section and a leg section, and an actuator coupled to the support frame and configured to support the leg section, wherein the actuator is operated electrically to move the leg section relative to the torso section between a raised position and a lowered position to create a leg break of a surgical patient in a lateral position, wherein the first and second rails each include a torso rail and a leg rail, the torso rails each extending from the head-cross beam towards the foot end to connect with the leg rail of the respective support rail, and each leg rail extends from connection with the torso rail of the respective support rail towards the foot end, wherein each leg rail includes a first sub-rail and a second sub-rail, and each first sub-rail extends from connection with the respective torso rail towards the foot end at an angle relative to the respective torso rail.

11. The surgical patient support of claim 10, wherein each first sub-rail extends from connection with the respective torso rail towards the foot end at an angle of about 15 to about 35 degrees relative to the respective torso rail.

12. The surgical patient support of claim 10, wherein each second sub-rail extends from connection with the foot-cross beam for connection with the respective first sub-rail.

13. The surgical patient support of claim 10, wherein in the lowered position, the leg section of the platform is parallel to each first sub-rail.

14. The surgical patient support of claim 10, further comprising a protection sheath coupled the second sub-rails and configured to block against pinch point formation during movement of the leg section.

15. The surgical patient support of claim 8, wherein the support frame includes a cross link that extends between the leg rails and a cross arm extending from the cross link to support the actuator.

16. The surgical patient support of claim 15, wherein the actuator is pivotably connected to the cross arm.

17. A surgical patient support system, comprising:

a base frame including a head elevator tower and a foot elevator tower each having a support bracket connected thereto for movement of the support brackets between higher and lower positions as the head and foot elevator towers are raised and lowered, respectively, a support frame including first and second rails extending parallel to each other from a head end to a foot end, a head-cross beam and a foot-cross beam extending between the first and second rails at the head end and foot end respectively, and connection arms including a head-connection arm engaged with the head-cross beam and coupled with the support bracket of the head tower and a leg-connection arm engaged with the leg-cross beam and coupled with the support bracket of the leg tower, a support platform coupled to the support frame and including a torso section and a leg section, and an actuator coupled to the support frame and configured to support the leg section, wherein the actuator is operated electrically to move the leg section relative to the torso section between a raised position and a lowered position to create a leg break of a surgical patient in a lateral position, wherein the torso section comprises a first flat panel and the leg section comprises a second flat panel, wherein the first and second rails each include a torso rail and a leg rail and wherein a bottom surface of the second flat panel is spaced apart from the leg rails when the leg section is in the raised position.

18. The surgical patient support of claim 17, wherein the bottom surface of the second flat panel rests atop the leg rails when the leg section is in the lowered position.

19. The surgical patient support of claim 17, wherein the first flat panel rests atop the torso rails during movement of the leg section between the raised and lowered positions.

* * * * *